(12) United States Patent
Modin et al.

(10) Patent No.: US 9,782,937 B1
(45) Date of Patent: Oct. 10, 2017

(54) APPARATUS FOR FORMING CONTOURED COMPOSITE LAMINATES

(71) Applicant: The Boeing Company, Chicago, IL (US)

(72) Inventors: Andrew Elmer Modin, Charleston, SC (US); Alexander Edward Petkus, Charleston, SC (US)

(73) Assignee: THE BOEING COMPANY, Chicago, IL (US)

( * ) Notice: Subject to any disclaimer, the term of this patent is extended or adjusted under 35 U.S.C. 154(b) by 199 days.

(21) Appl. No.: 14/279,725

(22) Filed: May 16, 2014

(51) Int. Cl.
*B29C 70/30* (2006.01)
*B29C 70/38* (2006.01)
*B29C 70/44* (2006.01)
*B29C 33/30* (2006.01)

(52) U.S. Cl.
CPC ............ *B29C 70/30* (2013.01); *B29C 33/307* (2013.01); *B29C 70/388* (2013.01); *B29C 70/443* (2013.01)

(58) Field of Classification Search
CPC ................ B29C 33/307; B29C 33/202; B29C 2033/205; B29C 2033/207; B29C 33/308; B29C 33/34; B29C 33/42
See application file for complete search history.

(56) References Cited

U.S. PATENT DOCUMENTS

| | | | | |
|---|---|---|---|---|
| 4,044,085 A | * | 8/1977 | Grawey | B29D 30/08 |
| | | | | 156/118 |
| 4,475,976 A | * | 10/1984 | Mittelstadt | B29C 70/342 |
| | | | | 100/211 |
| 4,824,631 A | * | 4/1989 | Yeager | B29C 33/405 |
| | | | | 156/264 |
| 5,292,475 A | * | 3/1994 | Mead | B29C 37/005 |
| | | | | 264/257 |
| 5,352,306 A | | 10/1994 | Grimshaw et al. | |
| 5,598,760 A | * | 2/1997 | Sucic | B23Q 35/102 |
| | | | | 29/889.6 |
| 5,648,109 A | | 7/1997 | Gutowski et al. | |
| 5,772,950 A | * | 6/1998 | Brustad | B29C 53/025 |
| | | | | 156/222 |
| 5,954,917 A | * | 9/1999 | Jackson | B29C 70/342 |
| | | | | 156/433 |
| 6,458,308 B1 | * | 10/2002 | Kato | B29C 43/203 |
| | | | | 264/257 |
| 6,814,916 B2 | * | 11/2004 | Willden | B29C 43/12 |
| | | | | 264/257 |
| 7,141,199 B2 | * | 11/2006 | Sana | B29C 70/345 |
| | | | | 264/255 |
| 7,534,387 B2 | | 5/2009 | Zenkner et al. | |
| 7,670,525 B2 | | 3/2010 | Weidmann et al. | |
| 7,943,076 B1 | | 5/2011 | Hawkins et al. | |
| 8,142,181 B2 | * | 3/2012 | Willden | B29C 43/12 |
| | | | | 264/292 |

(Continued)

OTHER PUBLICATIONS

Buttrick et al., "Method and Apparatus for Fabricating Contoured Laminate Structures," U.S. Appl. No. 13/901,813, filed May 24, 2013, 44 pages.

(Continued)

*Primary Examiner* — Matthew Daniels
(74) *Attorney, Agent, or Firm* — Yee & Associates, P.C.

(57) ABSTRACT

A composite prepreg laminate such as a hat type-stringer is formed on a contoured mandrel using a combination of mechanical sweeping and vacuum forming.

34 Claims, 25 Drawing Sheets

(56) References Cited

U.S. PATENT DOCUMENTS

| | | | |
|---|---|---|---|
| 8,151,529 B2 | 4/2012 | Weidmann et al. | |
| 8,349,105 B2 | 1/2013 | Kehrl et al. | |
| 8,551,380 B2 | 10/2013 | Hawkins et al. | |
| 8,556,618 B2 | 10/2013 | Bergmann | |
| 8,632,653 B2 | 1/2014 | Brown et al. | |
| 9,162,396 B2* | 10/2015 | Coxon | B29C 70/446 |
| 9,314,974 B2 | 4/2016 | Buttrick et al. | |
| 2006/0231981 A1* | 10/2006 | Lee | B29C 33/307 |
| | | | 264/320 |
| 2007/0229805 A1 | 10/2007 | Engelbart et al. | |
| 2009/0261199 A1 | 10/2009 | McCarville et al. | |
| 2009/0263618 A1 | 10/2009 | McCarville et al. | |
| 2009/0320292 A1* | 12/2009 | Brennan | B29C 70/446 |
| | | | 29/897.2 |
| 2010/0024971 A1 | 2/2010 | Benson et al. | |
| 2010/0102482 A1* | 4/2010 | Jones | B29C 33/307 |
| | | | 264/320 |
| 2010/0239865 A1* | 9/2010 | Kallinen | B29C 70/46 |
| | | | 428/411.1 |
| 2011/0127698 A1* | 6/2011 | Alenby | B29C 70/54 |
| | | | 264/510 |
| 2012/0006475 A1 | 1/2012 | Colombo et al. | |
| 2012/0076973 A1 | 3/2012 | Guzman et al. | |
| 2013/0084434 A1 | 4/2013 | Kehrl et al. | |
| 2014/0065354 A1 | 3/2014 | Smith, Jr. et al. | |
| 2014/0103585 A1 | 4/2014 | Coxon et al. | |
| 2015/0041048 A1 | 2/2015 | Anderson et al. | |
| 2016/0121560 A1 | 5/2016 | Lee et al. | |

OTHER PUBLICATIONS

Prause et al., "Method and Apparatus for Forming Contoured Composite Laminates," U.S. Appl. No. 15/240,529, filed Aug. 18, 2016, 88 pages.

* cited by examiner

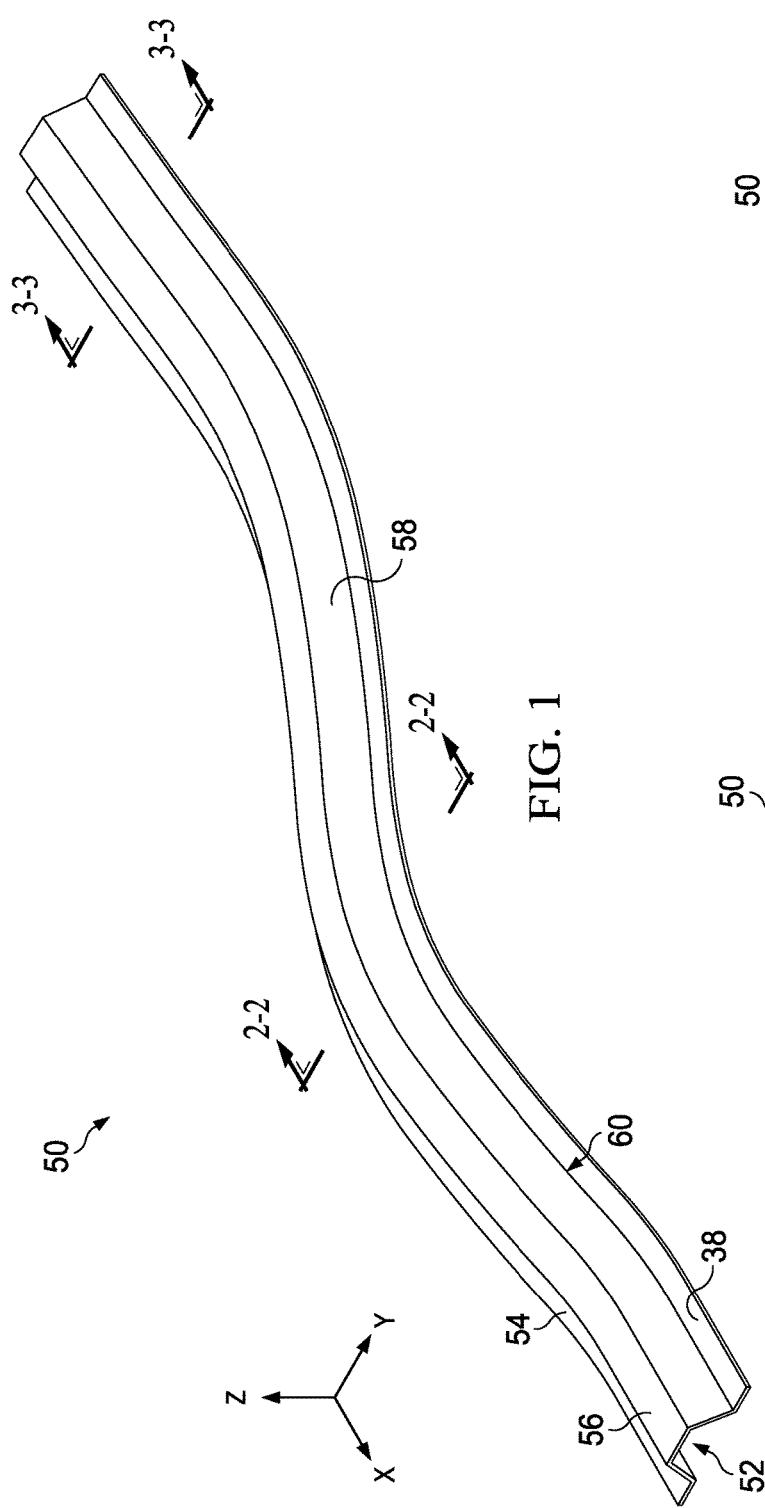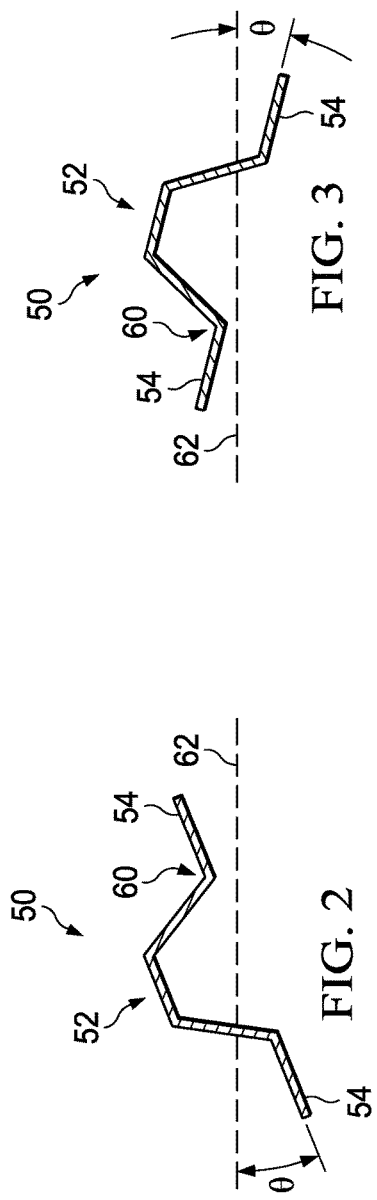

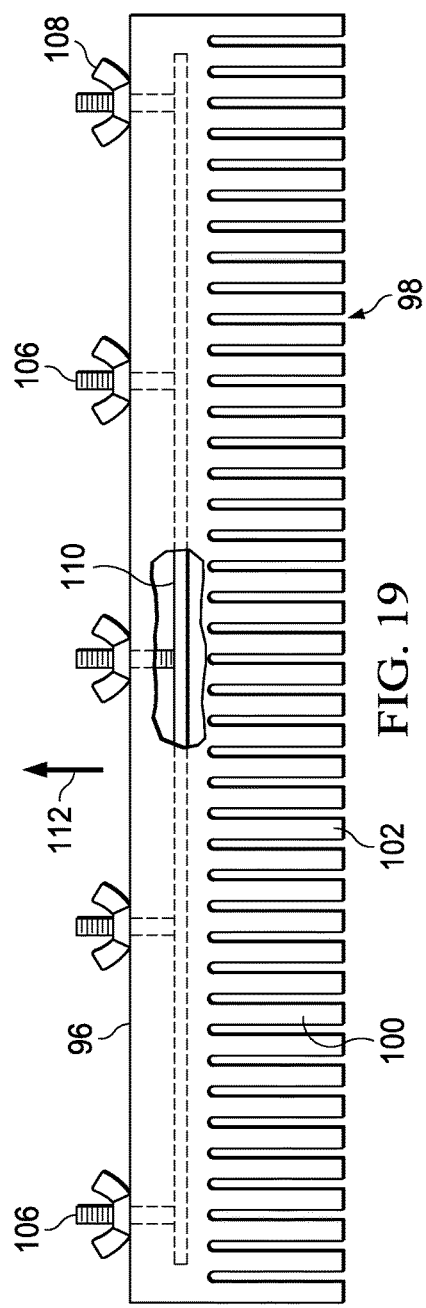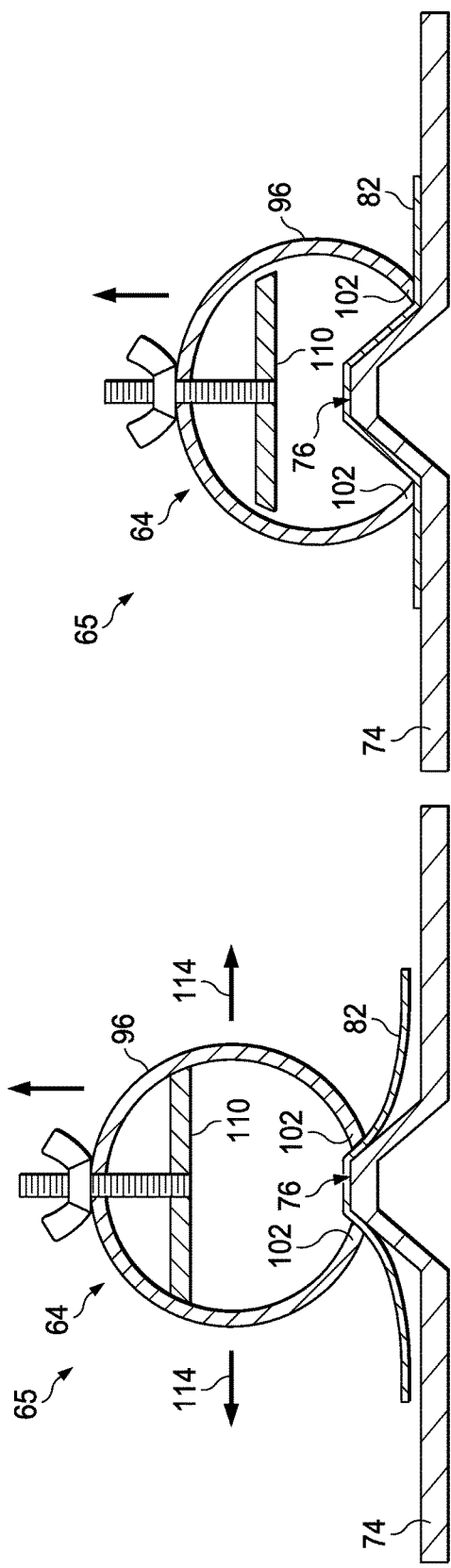

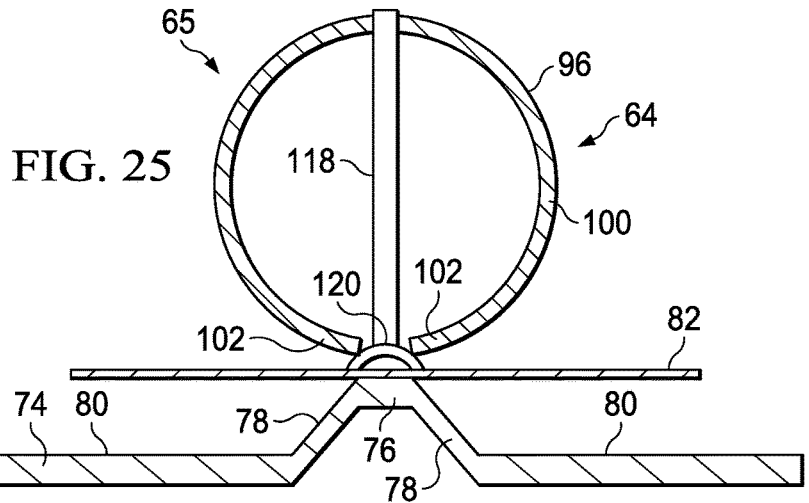
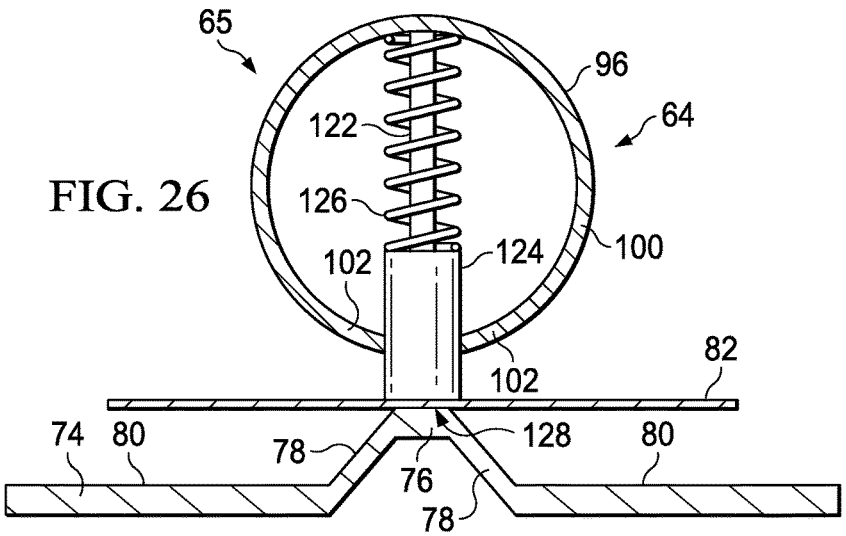
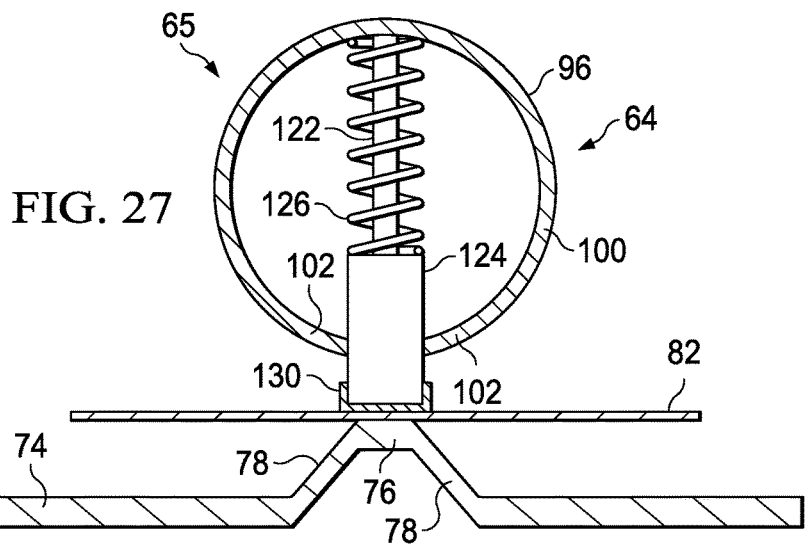

APPARATUS FOR FORMING CONTOURED COMPOSITE LAMINATES

BACKGROUND INFORMATION

1. Field

The present disclosure generally relates to the fabrication of composite structures, and deals more particularly with a method and apparatus for fabricating concave and convex stiffeners such as stringers, especially those that are contoured.

2. Background

Composite laminate structural stiffeners are sometimes required to have complex contours tailored to particular applications. For example, in the aircraft industry, composite laminate stringers used to stiffen aircraft skins are sometimes contoured in one or more planes in order to match changes in the geometry of the skins.

Layup and forming of structural stiffeners with complex contours can be challenging because of the tendency of the uncured composite prepreg material to bridge or wrinkle in the areas of contours. Bridging results in undesired resin rich-areas in the laminate, while wrinkling may produce undesired localized high stress concentrations. In order to minimize these problems, composite laminate structural stiffeners such as stringers are usually laid up by hand in order to minimize bridging and wrinkling. However, even using hand layup techniques, bridging and wrinkling of the laminate sometimes occurs which requires hand rework of the stiffener, typically using patches. Hand layup of stiffeners and rework of stiffener non-conformities is both labor-intensive and time-consuming, and therefore expensive.

Accordingly, there is a need for a method and apparatus for laying up and forming contoured composite stiffeners such as composite laminate prepreg stringers, that reduce non-conformities and touch labor. There is also a need for a method and apparatus of the type mentioned above which may increase production throughput while reducing factory floor space required for stiffener production.

SUMMARY

The disclosed embodiments provide a method and apparatus for partially automating the fabrication of composite prepreg laminate stiffeners such as stringers, which reduces nonconformities and attendant rework, while reducing touch labor and increasing factory throughput. The disclosed method and apparatus employ a combination of mechanical sweeping and vacuum forming to form composite prepreg plies onto complex contours of a tool without substantial bridging or wrinkling.

According to one disclosed embodiment, an apparatus is provided for forming a composite prepreg laminate. The apparatus includes a mandrel having a contoured surface, and a forming head configured to sweep the prepreg ply onto a first portion of the contoured surface of the mandrel. The apparatus also includes a flexible diaphragm covering the prepreg ply and configured to vacuum form the prepreg ply onto a second portion of contoured surface of the mandrel. The forming head includes a plurality of fingers configured to slidably engage and press the prepreg ply against the first portion of the contoured surface of the mandrel. The fingers may be flexible and include fingertips for individually engaging the prepreg ply. The forming head may include a tube having a plurality of slots therein, and the fingers are defined between the slots. The forming head may also include a ram for displacing the forming head. A device is provided for spreading the fingers, which may comprise a plate adjustably mounted on the forming head and contacting the fingers. In another embodiment, the device for spreading the fingers is an inflatable bladder. In one embodiment, the forming head includes a cam/pivoting mechanism coupled with the fingers for controlling operation of the fingers. The diaphragm is sealed around its periphery and forms a chamber capable of being evacuated. The diaphragm may be a flexible vacuum bag which surrounds the prepreg ply and is capable of being evacuated. The forming head may further include a device for securing a portion of the prepreg ply against a section of the mandrel.

According to another disclosed embodiment, an apparatus is provided for forming a contoured composite laminate stringer having a hat cross-section and a pair of flanges. The apparatus comprises a contoured elongate mandrel on which at least one composite prepreg ply may be placed. The mandrel has a cap section, a pair of web sections and a pair of flange sections. The apparatus further comprises a plurality of former modules. Each of the former modules includes a forming head having forming fingers configured to sweep the prepreg ply onto the flange sections of the mandrel. The apparatus also includes or accepts a flexible diaphragm configured to be sealed around its periphery for vacuum forming the prepreg ply against the flange sections of the mandrel. The flexible diaphragm may comprise latex that is stretchable substantially only in one direction. In one variation, each of the forming heads include a tube having a plurality of slots therein, and the fingers are located between the slots. The fingers are flexible and are arranged in opposing sets of fingers. A mechanism is provided for adjusting the distance between the opposing sets of fingers. The orientation of each of the former modules is adjustable. The apparatus may also include at least one mechanism for aligning the forming head with local sections of the mandrel. The mechanism adjusts roll, pitch and yaw of the forming head. The apparatus may also include at least one support beam, wherein each of the former modules is mounted on the support beam.

According to still another disclosed embodiment, an apparatus is provided for forming a contoured composite prepreg laminate. A contoured mandrel is provided on which at least one composite prepreg ply may be formed. A plurality of former modules are arranged side-by-side for respectively forming the prepreg ply on the mandrel. Each of the former modules includes a forming head associated with a section of the mandrel for forming the prepreg ply on the associated section of the mandrel. A mechanism is provided for aligning each of the forming heads with the contour of the associated section of the mandrel. The mechanism is capable of adjusting roll, pitch and yaw of the forming head. Each of the former modules includes a frame having a forming head mounted thereon, and the mechanism is capable of pivoting the frame.

According to another disclosed embodiment, a method is provided of forming a composite prepreg laminate. At least one prepreg ply is placed on a contoured mandrel. The prepreg ply is mechanically swept over a first section of the contoured mandrel, and is vacuum formed over a second section of the contoured mandrel. The vacuum forming is performed after the mechanical sweeping of the ply. The method may further comprise clamping a third section of the prepreg ply on the contoured mandrel. The mechanical sweeping may be performed by applying pressure to the prepreg ply using the opposing sets of fingers, pressing the prepreg ply against the second section of the mandrel using the opposing sets of fingers, and displacing the opposing sets of fingers as the opposing sets of fingers are pressing the prepreg ply against the second section of the mandrel. The method may also include using the opposing sets of mechanical fingers to hold the prepreg ply against the mandrel while the prepreg ply is being vacuum formed/consolidated over the second section of the mandrel. The mechanical sweeping of the ply may be performed using a plurality of forming heads. The method also includes aligning each of the forming heads with the contoured mandrel.

According to another disclosed embodiment, a method is provided of forming a contoured composite laminate stringer having a hat section, and a pair of flanges. At least one composite prepreg ply is placed on a contoured mandrel, and then clamped on a cap section of the contoured mandrel. The ply is swept over web sections of the mandrel, while it is held against an inside radius of the mandrel. The ply is then vacuum formed over flange sections of the mandrel.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present disclosure when read in conjunction with the accompanying drawings, wherein:

FIG. 1 is an illustration of a perspective view of a composite prepreg laminate stringer having complex contours.

FIG. 2 is an illustration of a sectional view taken along the line 2-2 in FIG. 1 showing roll in the stringer, wherein the X-Y plane is indicated by a broken line.

FIG. 3 is an illustration of a sectional view taken along line 3-3 in FIG. 1, showing another roll in the stringer, wherein the X-Y plane is indicated by a broken line.

FIG. 19 is an illustration of a side elevational view of an alternate embodiment of a ply sweeper, portions of the ply sweeper having been broken away to reveal a spreader plate.

FIGS. 20 and 21 are illustrations of cross-sectional views showing the ply sweeper of FIG. 19 sweeping a ply over a contoured mandrel.

FIG. 25 is an illustration of a cross-sectional view showing another embodiment of the ply sweeper.

FIG. 26 is an illustration of a cross-sectional view showing a further embodiment of the ply sweeper in which the cap is pressed and fingers are held apart prior to sweeping.

FIG. 27 is an illustration of a cross-sectional view showing still another embodiment of the ply sweeper in which the sides of the cap presser are pulled toward one another as contact is made with the cap.

DETAILED DESCRIPTION

Figure 4:
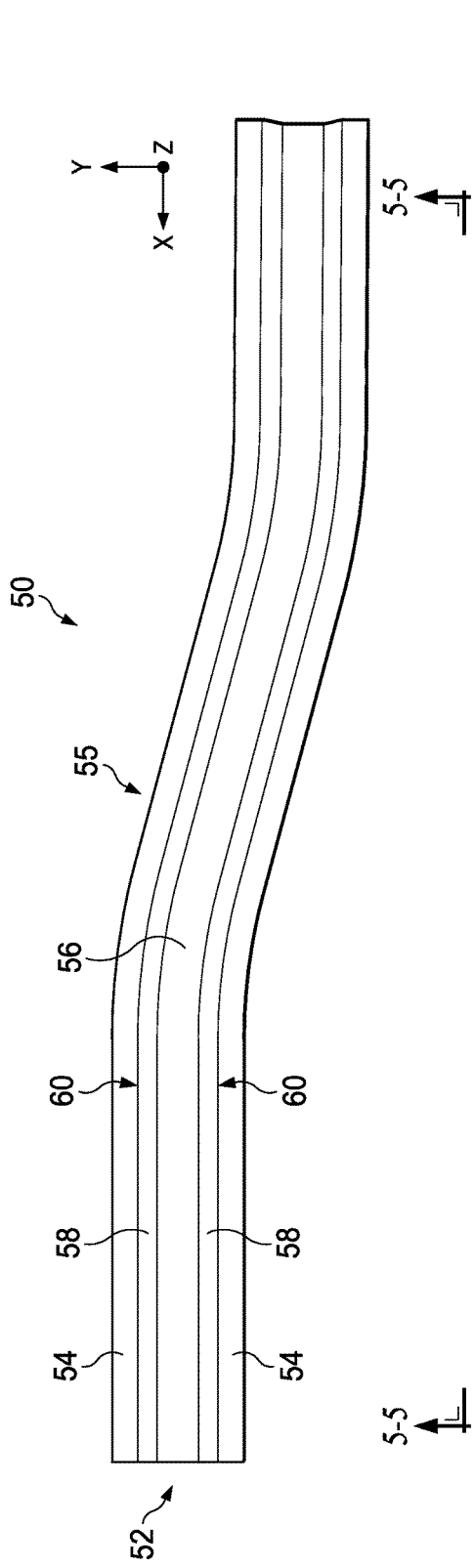
FIG. 4 is an illustration of a top plan view of the stringer shown in FIG. 1, showing changes in yaw.
Figure 5:
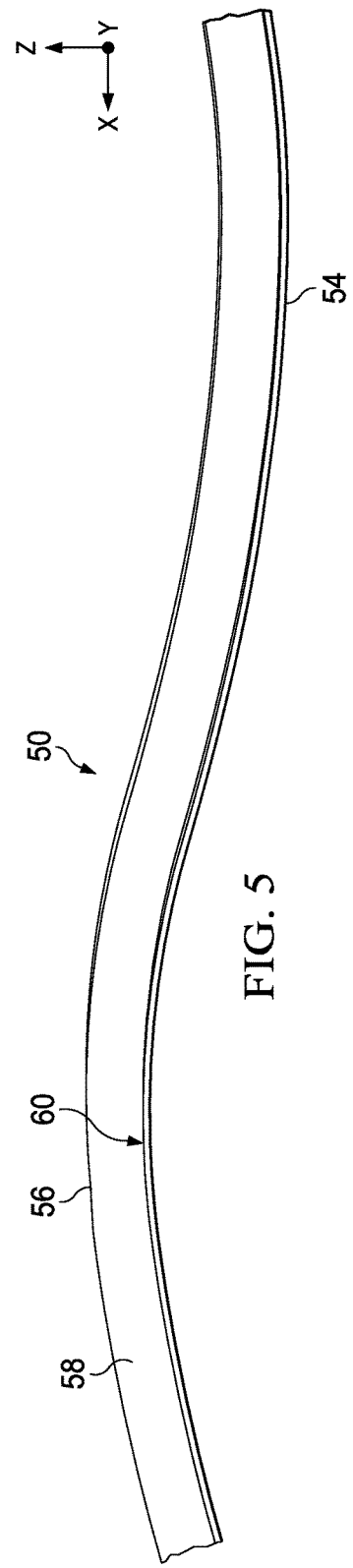
FIG. 5 is an illustration of a side elevational view of the stringer shown in FIG. 1, showing changes in pitch.

Referring to FIGS. 1-5, the disclosed embodiments relate to a method and apparatus for laying up, forming and handling a composite prepreg structure such as a multi-ply laminate stiffener. The stiffener may be, for example, a contoured composite stringer 50. The stringer 50, sometimes referred to as a hat section 50 includes a cap 56, a pair of webs 58, and a pair of flanges 54. An inside radius 60 joins the web and flange surfaces. While a hat type stringer 50 is illustrated, a wide variety of other cross-sectional stiffener shapes may be formed by the disclosed method and apparatus discussed below. The stringer 50 is formed from laminated plies of a fiber reinforced polymer resin such as, without limitation, carbon fiber epoxy. The stringer 50 may be fabricated using plies of unidirectional prepreg that are laid up and formed individually, or in groups (i.e., multiple plies).

The stringer 50 may have one or more complex contours along its length. Any of these contours may be constant or varying. For example, the illustrated stringer 50 has curvatures (see FIGS. 1 and 4) in the X-Y plane, and curvatures (FIG. 5) in the X-Z plane. Portions of the stringer 50 may also be twisted at a constant or varying angle θ (FIGS. 2 and 3) in the Y-Z plane. For ease of description hereinafter, curvature in the Y-Z plane will be referred to roll (twist), curvature in the X-Z plane will be referred to as pitch, and curvature in the X-Y plane will be referred to as yaw.

Figure 6:
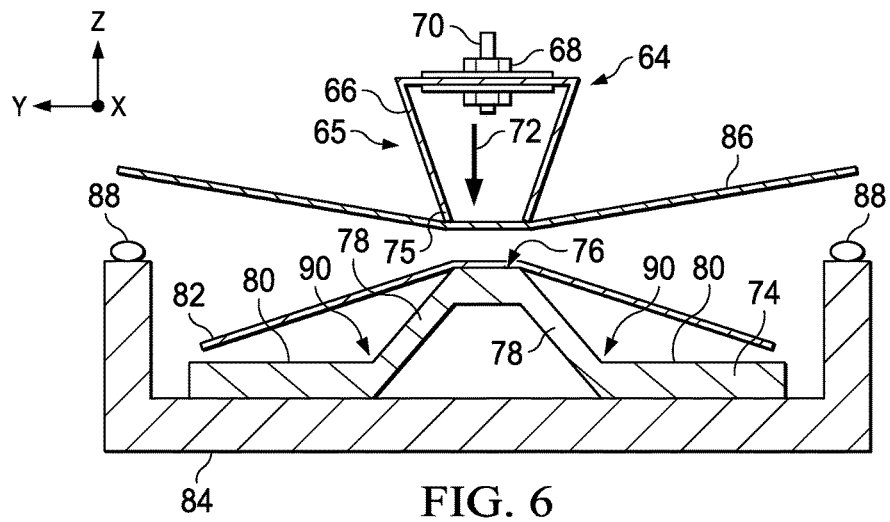
FIGS. 6-12 are illustrations of cross-sectional views of apparatus for mechanical sweeping and vacuum forming composite prepreg plies on a mandrel having complex contours, respectively showing sequential forming steps.

Referring now to FIG. 6, at least one composite prepreg ply 82 may be laid up and formed on a layup tool such as a contoured elongate mandrel 74 mounted on a tool base 84. The mandrel 74 has an outer contoured surface comprising a first portion and a second portion. The first portion of the contoured mandrel surface comprises a cap section 76, a pair of web sections 78, and inside radii 90. A second portion of the contoured mandrel surface comprises a pair of flange sections 80. The cap section 76, web sections 78, inside radii and flange sections 80 all have substantially the same size, shape and location as the IML (inner mold line) of the stringer 50 shown in FIGS. 1-5.

As will be discussed below in more detail, at least one ply 82 is laid up and formed on the mandrel 74 using a two-step process comprising mechanical sweeping and vacuum forming. The mechanical sweeping of the ply is performed by a forming head 64 which is stroked down over the web sections 78, and the vacuum forming is performed by a vacuum membrane such as, without limitation, a flexible diaphragm 86. As will become apparent later in the description, any of a variety of mechanisms and techniques may be employed to perform the mechanical sweeping and the vacuum forming. As previously noted, in some embodiments, multiple plies 82 may be simultaneously laid up and formed on the mandrel 74.

The forming head 64 includes a ply sweeper 65 which may comprise a plurality of longitudinally spaced mechanical forming fingers 66 that are arranged in opposing sets thereof. In one embodiment, the forming fingers 66 may be formed of a flexible, resilient material such as plastic, composite, metal etc. The ply sweeper 65 is mounted by suitable hardware 68 to a ram which may comprise, for example and without limitation, a pneumatic piston rod 70. The piston rod 70 drives the ply sweeper 65 downwardly 72, causing the forming fingers 66 to initially clamp the ply 82 on the cap section 76 in order to maintain alignment of the ply 82 relative the mandrel 74 during the subsequent forming process. Continued downward movement of the piston rod 70 causes the forming fingers 70 to deflect outwardly while maintaining pressure against the ply 82, thereby sweeping the ply 82 down over, and conforming to the web sections 78 of the mandrel 74.

The flexible diaphragm 86 is disposed between the mandrel 74 and the forming head 64. The diaphragm 86 is sealed around its periphery to the tool base 84 by seals 88, forming a substantially vacuum tight chamber around the flange sections 80. The diaphragm 86 may be formed of a suitable material such as reinforced latex, silicone or the like which, while flexible, is substantially stretchable only in one direction (in the direction of the X-axis). In some embodiments, the diaphragm 86 may be a separate element that is manually placed between the forming head 64 and the mandrel 74. Alternatively, the diaphragm 86 along with one or more plies 82 adhered to it may be shuttled together between the forming head 64 and the mandrel 74. In other embodiments, however, the diaphragm 86 may be attached to, and form a part of the forming head 64. In still other embodiments discussed later herein, the diaphragm 86 may comprise an encapsulating membrane, such as tube-type flexible vacuum bag that surrounds the ply layup.

Figure 7:
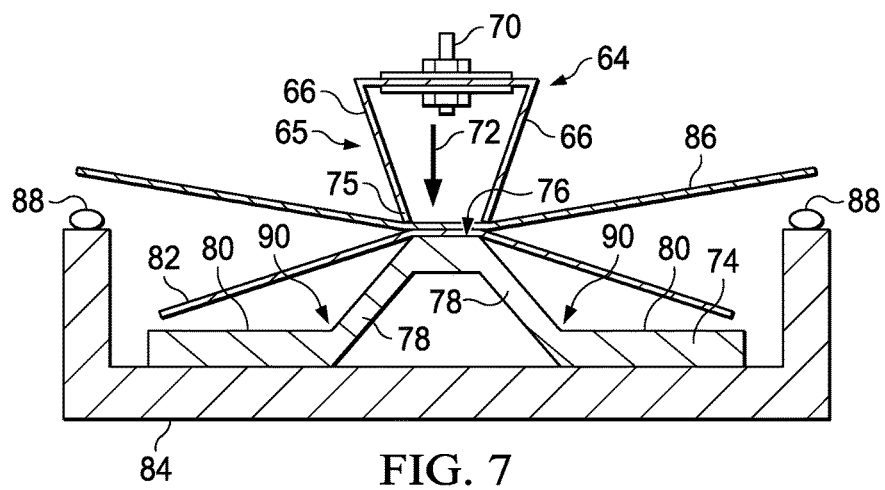
Figure 8:
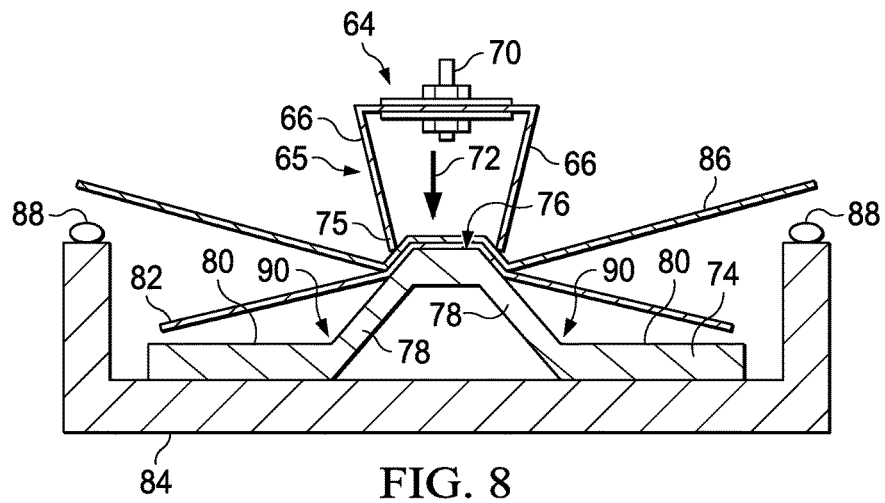

The sequential steps of forming the ply 82 are illustrated in FIGS. 7-12, according to one method embodiment. Initially, as shown in FIG. 7, with the tips 75 of the fingers 66 spread apart sufficiently to clear the cap section 76, the forming head 64 is displaced downwardly 72, causing the fingers 66 to initially clamp a portion of the diaphragm 86 and ply 82 against the cap section 76 of the mandrel 74. With the ply 82 clamped against the cap section 76, and therefore immobilized, the forming head 64 continues its downward displacement 72, causing the finger tips 75 to apply pressure to and form the ply 82 down against the web sections 78 of the mandrel 74, as shown in FIG. 8.

Figure 9:
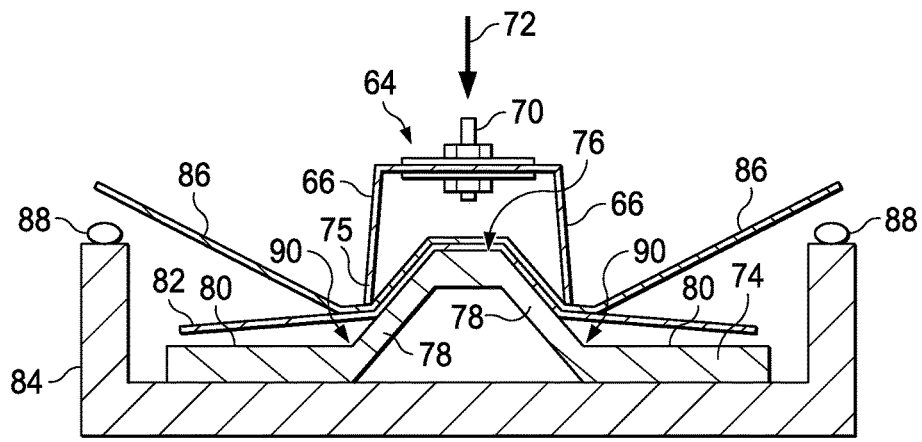
Figure 10:
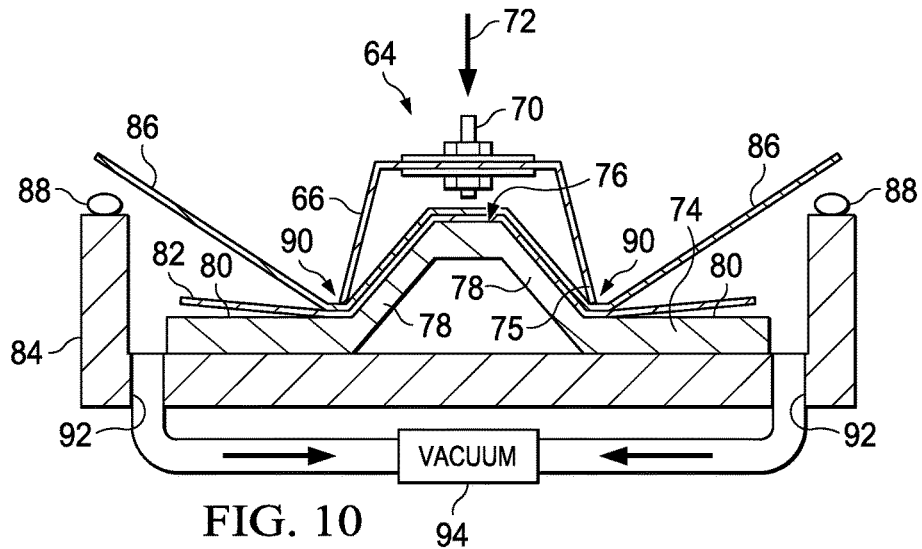
Figure 11:
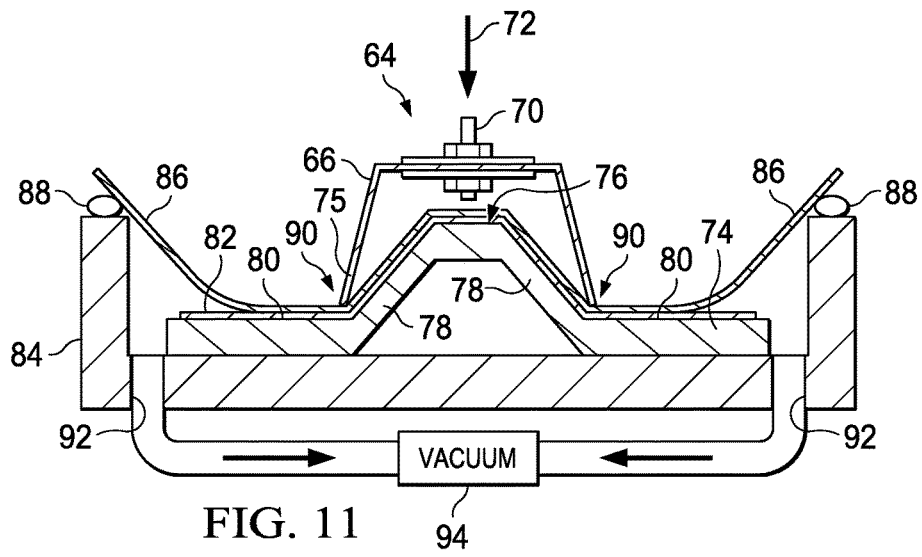

Continued downward movement 72 of the forming head 64, shown in FIGS. 9 and 10, causes the ply sweeper 65 to form the ply 82 against the remaining portions of the web sections 78 until the fingertips 75 reach the inside radii 90 (FIG. 10). At this point, both the cap 56 and the webs 58 of the stringer 50 fully match the geometry of the web sections 78 of the forming mandrel 74. Next, shown in FIG. 11, with the fingertips holding the ply 82 against the mandrel 74 at the inside radii 90, the diaphragm 86 is sealed to the tool base 84, and then evacuated using a vacuum source 94 to draw air through openings 92 in the tool base 84.

Figure 12:
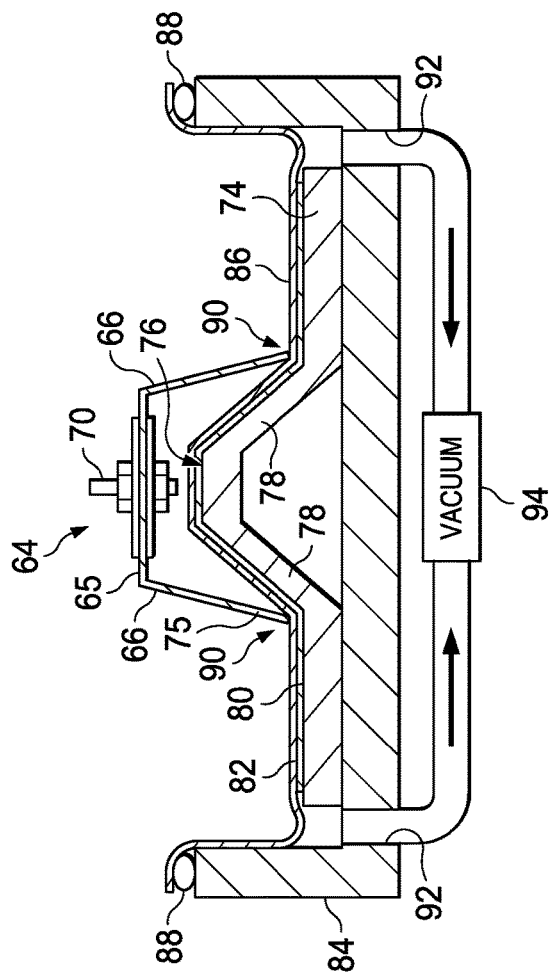

Referring to FIG. 12, the evacuation of the diaphragm 86 causes the diaphragm 86 to draw the ply 82 down against the flange sections 80 of the mandrel 74, thereby completing matching the geometry of the flange sections 80 of the forming mandrel 74. With the shape of the stringer 50 having been fully formed, the forming head 64 is raised, and the diaphragm 86 is drawn away, permitting removal of the fully formed stringer 50 from the mandrel 74. In some embodiments, as will be discussed below in more detail, the mandrel 74 may also be employed to transport and place the completed stringer 50 onto a cure tool (not shown) for curing.

Figure 13:
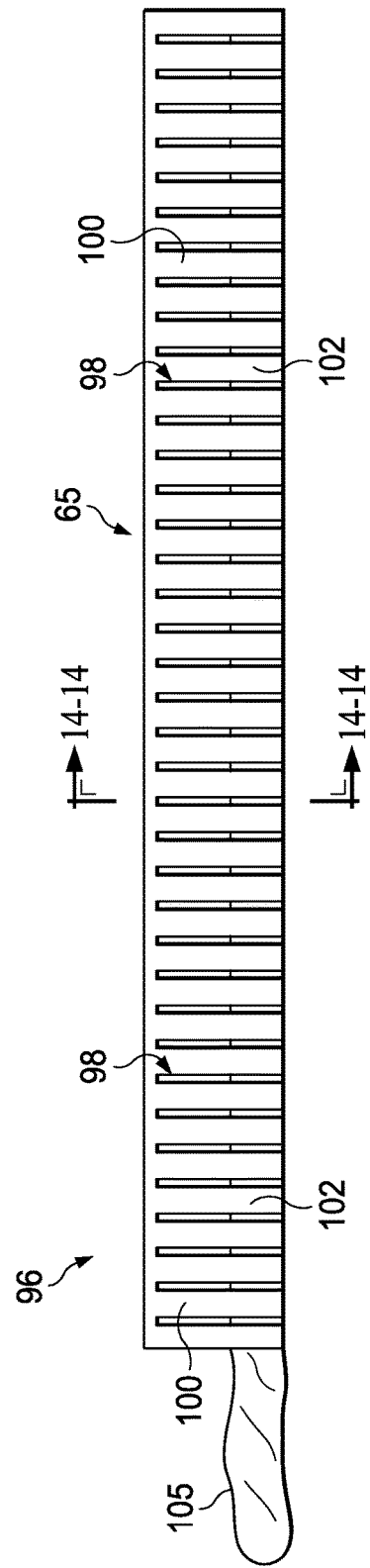
FIG. 13 is an illustration of a side elevational view of a ply sweeper along with a vacuum bagged composite laminate ply.
Figure 14:
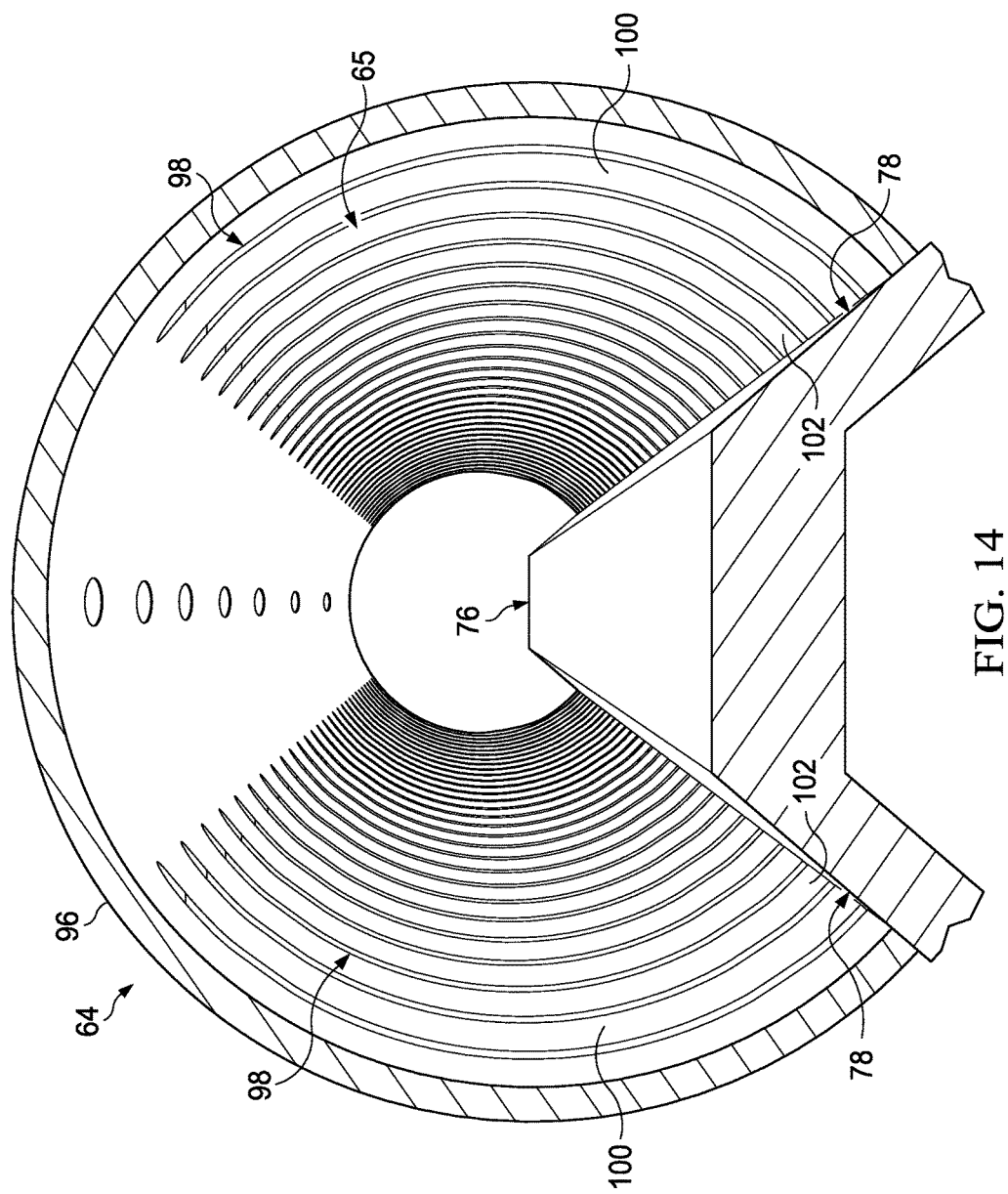
FIG. 14 is an illustration of an isometric, cross sectional view taken along the line 14-14 in FIG. 13.

FIGS. 13 and 14 illustrate an embodiment of the ply sweeper 65 comprising a tube 96 having a plurality of longitudinally spaced slots 98 therein which define two sets of opposing, flexible forming fingers 100. The tube 96 may be formed of a flexible, resilient material such as, without limitation, plastic, and the slots 98 may be formed using any suitable fabrication process such as sawing or cutting. The opposed flexible fingers 100 have fingertips 102 that are spaced apart sufficiently to clear the cap section 76, as best seen in FIG. 14. In the embodiment illustrated in FIGS. 13 and 14, a tube-type vacuum bag 105 is sleeved over the plies 82 and the mandrel 74.

When evacuated, the tube-type vacuum bag 105 vacuum forms the plies 82 down onto the flange sections (FIG. 12) of the mandrel 74. In some embodiments, compliance of the tube 96 to the shape of the mandrel 74 may be achieved by dividing the tube 96 into a plurality of individual sections, each adjustable to match local contours of the mandrel 74.

In other embodiments, however, a single tube 96 extending along the entire length of the mandrel 74 may be employed to perform the sweeping action. Where a single tube 96 is used, the necessary compliance of the tube 96 to changing mandrel contours (roll, pitch and yaw) may be obtained by providing the top 97 of the tube 96 with flexibility, either by segmenting the top 97 of the tube 96, or by forming the top 97 of the tube 96 from a flexible material such as a rubber.

Figure 15:
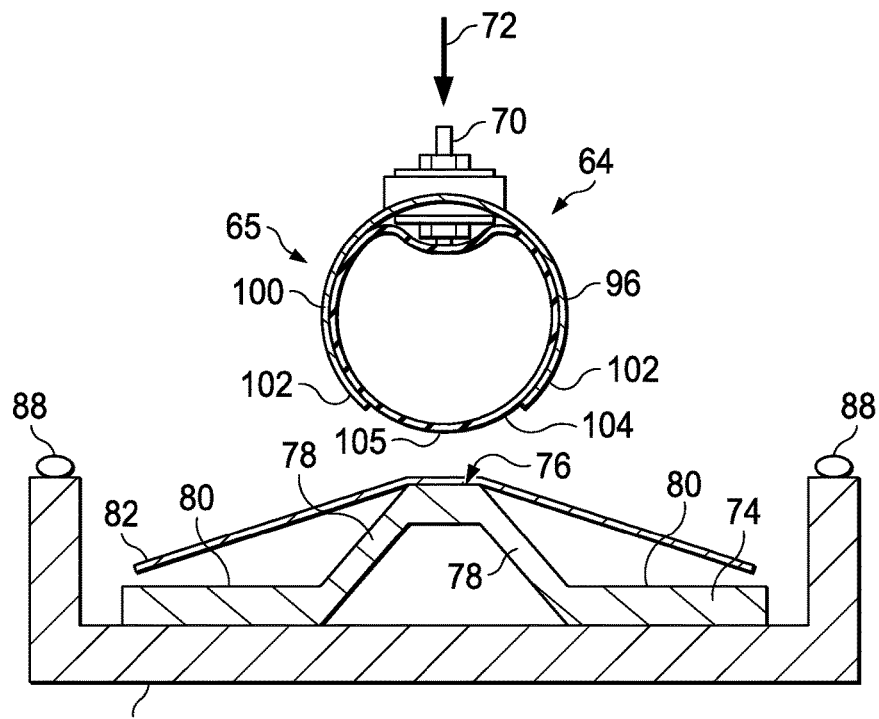
FIGS. 15-18 are illustrations of cross-sectional views of an alternate embodiment of apparatus for mechanical sweeping and vacuum forming composite plies on a contoured mandrel.

Depending upon the type of ply sweeper 65 being employed, it may be necessary to spread the fingertips 102 a distance that is greater than the width of the cap section 76 of the mandrel 74. One device for spreading or opening the fingertips 102 is shown in FIGS. 15-18. Referring to FIG. 15, an inflatable bladder 104 is disposed inside the tube 96, as shown in FIGS. 13 and 14. The bladder 104 may be inflated using any suitable pressurized fluid, such as air. With the bladder 104 fully inflated, as shown in FIG. 15, a lower portion 105 of the bladder 104 extends below the fingertips 102.

Figure 16:
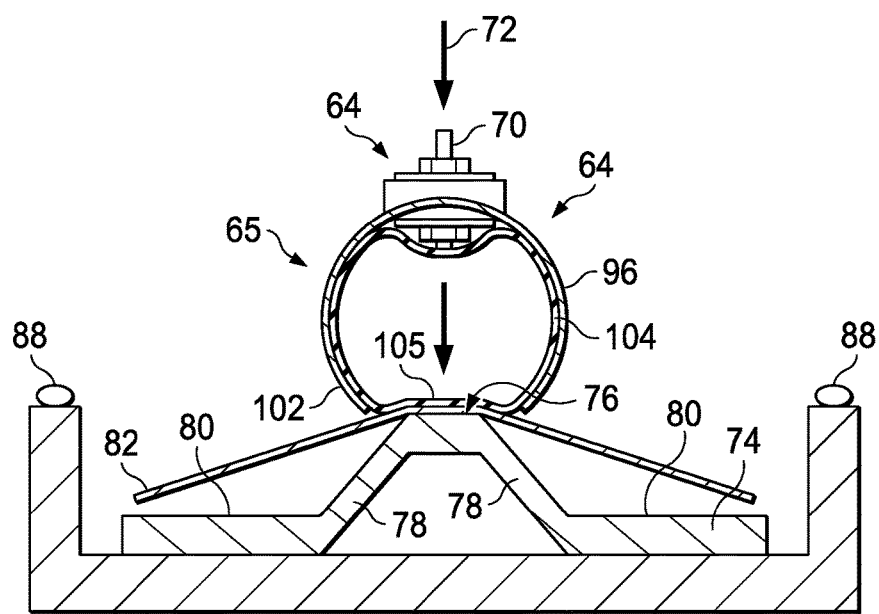
Figure 17:
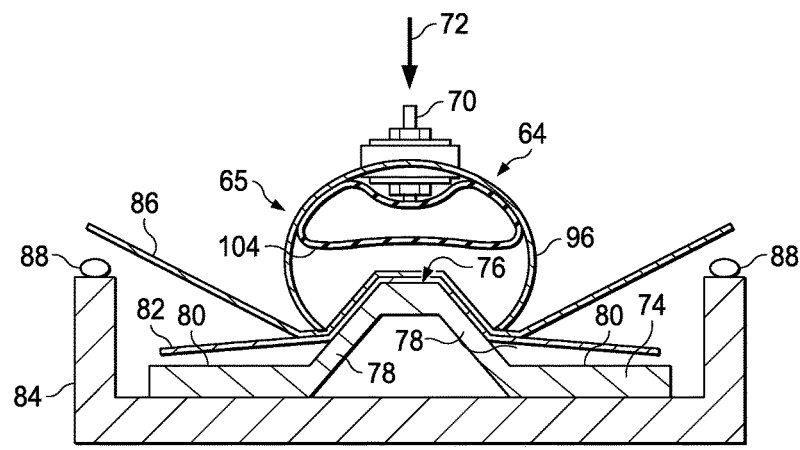
Figure 18:
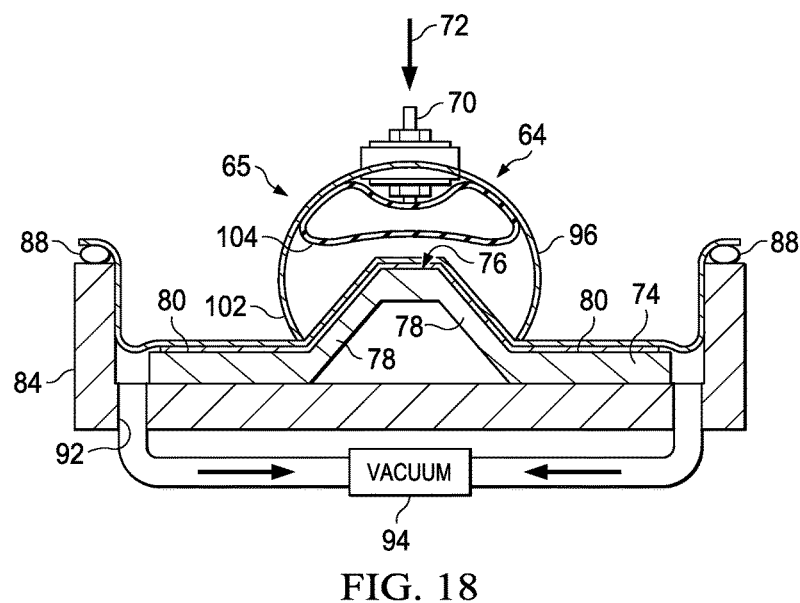

Referring to FIG. 16, as the forming head 64 is displaced downwardly, the lower portion of the bladder 104 initially contacts the ply 82, clamping it against the cap section 76 of the mandrel 74 in order to maintain alignment of the ply 82 relative to the mandrel 74 during the subsequent forming process. When the fingertips 102 clear the cap section 76 and began forming the ply 82 against the web sections 78, the bladder 104 is deflated, as shown in FIG. 17, permitting the finger forming process to continue. The bladder 104 remains substantially deflated until the fingertips 102 have formed the ply 82 down into the inside radii 90, as shown in FIG. 18.

Other techniques may be employed, where necessary, to spread the fingertips 102 a distance that is sufficient to clear the cap section 76 of the mandrel 74. For example, referring to FIG. 19, a longitudinally extending spreader plate 110 may be installed inside the tube 96 and used to open the fingers 100. The spreader plate 110 has threaded studs 106 that pass through the top of the tube 96. Wingnuts 108 or similar fasteners on the threaded studs 106 may be adjusted to alter the vertical position of the spreader plate 110. In some embodiments, a power operated device such as a pneumatically or electrically driven screw drive (not shown) may be employed in lieu of the wing nuts 108 to provide automated adjustment of the position of the spreader plate 110. Referring to FIG. 20, as the spreader plate 110 is drawn upwardly in response to adjustment of the wingnuts 108, the spreader plate 110 engages the inner diameter of the tube 96, forcing the opposing sets of fingertips 102 to spread 114 until they clear the cap section 76 the mandrel 74. Continued downward movement of the tube 96 (see FIG. 21) allows the fingertips 102 to complete forming of the web sections 58 of the stringer 50.

Figure 22:
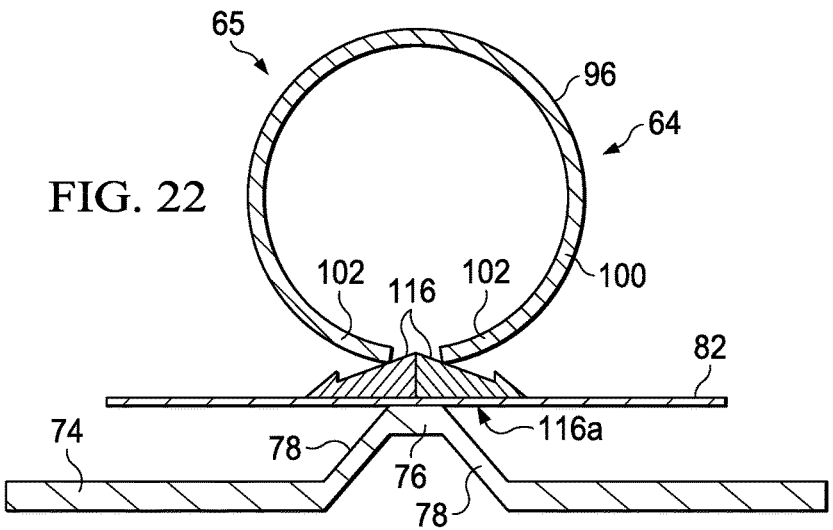
FIGS. 22-24 are illustrations of cross-sectional views showing an alternate embodiment of the ply sweeper progressively forming a ply over a contoured mandrel.
Figure 23:
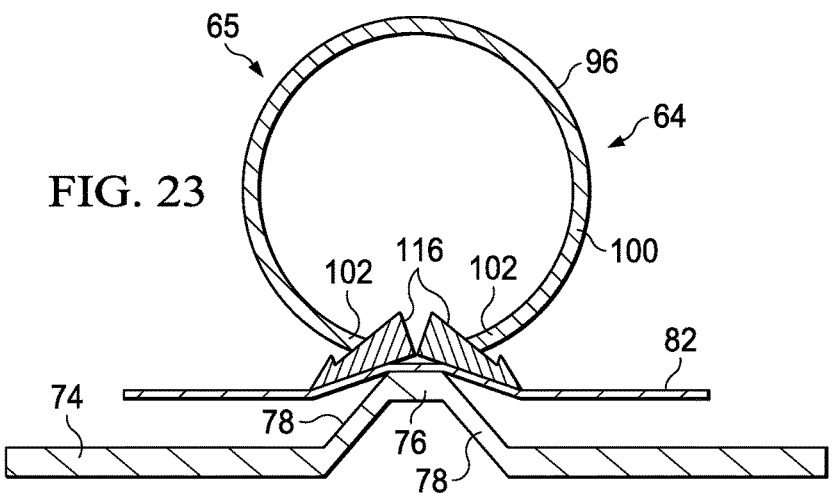
Figure 24:
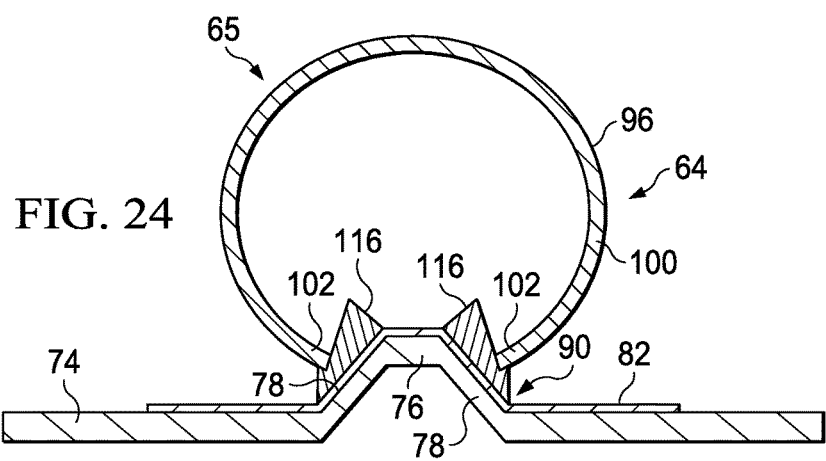

FIGS. 22-24 illustrate another embodiment of the sweeper 65 having forming fingers 100 similar to those previously described. In this embodiment, movable forming elements 116 are captured between the fingertips 102 and the ply 82. The forming elements 116 have flat surface areas 116*a* that engage a greater surface area of the ply 82, compared to the embodiments shown in FIGS. 19-21 in which only the outer ends of the fingertips 102 engage the ply 82. As the tube 96 is displaced downwardly, as shown in FIG. 23, the forming elements 116 pivot relative to the fingertips 102, forcing the ply down against the web sections 78 of the mandrel 74. The forming elements 116 continue pivoting until they form the ply 82 down into the inside radii 90, as shown in FIG. 24.

A variety of other techniques may be employed to clamp the ply 82 to the cap section 76 in order to maintain alignment of the ply 82 relative to the forming mandrel 74 as the ply 82 is being formed. For example, referring to FIG. 25, a clamping element 120 is mounted on the end of a rod 118 that passes through the top of the tube 96. Downward displacement of the rod 118 brings a clamping element 120 into contact with the ply 82, forcing the ply 82 against the cap section 76. With the ply 82 clamped against the cap section 76, the tube 96 is displaced downwardly relative to the rod 118, allowing the forming fingers 100 to sweep the ply 82 over the web sections 78.

FIG. 26 illustrates another embodiment of the forming head 64 in which clamping of the ply 82 to the cap section 76 is performed by a spring-loaded clamping member 124 having a clamping surface 128 that is approximately the same width as the cap section 76. The clamping member 124 may comprise, for example and without limitation, rigid plastic having a hollow core. The use of a relatively broad clamping surface 128 may assist in maintaining the cap 56 relatively flat during the forming process. The clamping member 124 is attached to a rod 122 surrounded by a compression spring 126 that is trapped between the clamping member 124 and the inside surface of the tube 96. As the forming head 64 moves downwardly, the clamping member 124 makes initial contact with the ply 82.

Continued downward movement of the forming head compresses the spring 126, which in turn loads the clamping member 124 against the ply 82 and the cap section 76. As the tube 96 continues its downward movement, the fingers 100 sweep the ply 82 over the web sections 78, and the rod 122 is allowed to move up through the top of the tube 96. In some embodiments, as shown in FIG. 27, it may be necessary or desirable to place a membrane over the bottom of the clamping member 124 to assist in flexing the sides of the clamping member 124 toward the webs as the cap is clamped, further providing a smooth transition of the fingers from the sides of the clamping member 124 to the webs 78.

Figure 28:
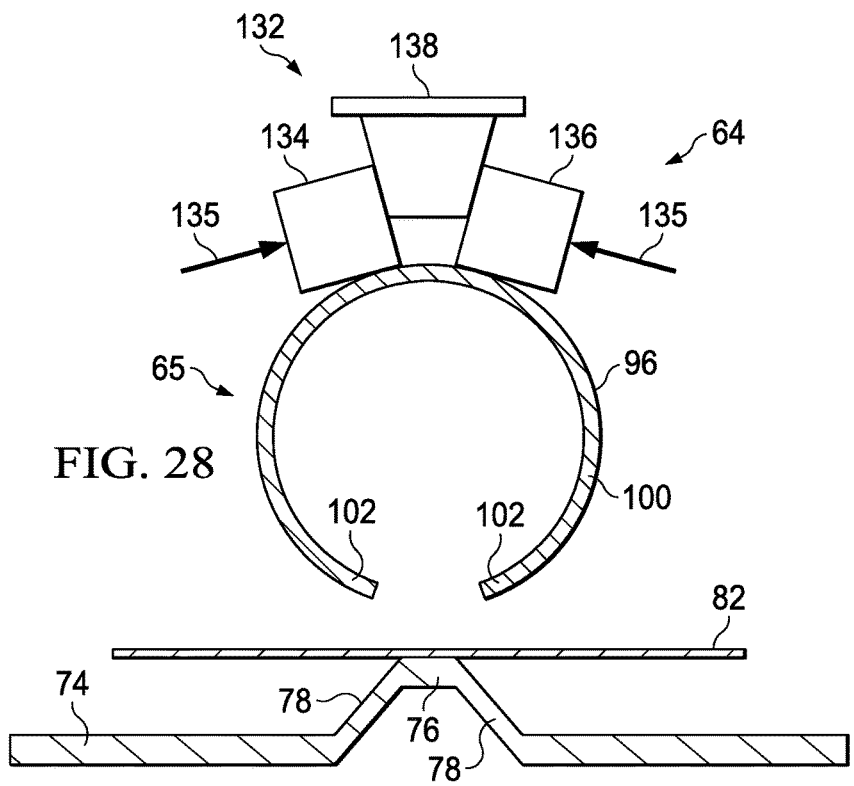
FIGS. 28 and 29 are illustrations of cross-sectional views showing a further embodiment of the ply sweeper progressively forming a ply over a contoured mandrel in which the finger halves are split.
Figure 29:
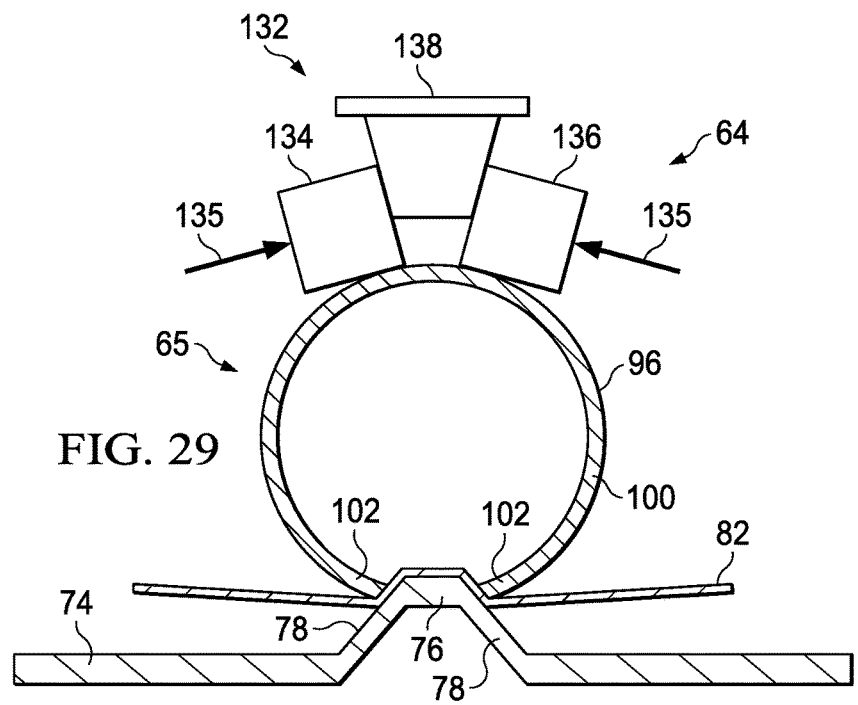

Attention is now directed to FIGS. 28 and 29 which illustrate another embodiment of the forming head 64 which utilizes a cam mechanism 132 for controlling the position of the forming fingers 100 during the ply sweeping process. The cam mechanism 132 comprises a cam member 138 wedged between a pair of a pair of spreader blocks 134, 136 which act as cam followers that are displaced by downward movement of the cam member 138. The spreader blocks 134, 136 are respectively attached to two sets of independent and opposing forming fingers 100. The spreader blocks 134, 136 are spring-loaded 135 toward each other, causing fingers 100 to normally spread apart. However, pressure applied to the spreader blocks 134, 136 by the cam member 138 overcomes the force of the spring-loading, forcing the fingers 100 toward each other.

FIG. 28 shows the fingertips 102 spread apart a distance that is sufficient to clear the cap section of the mandrels 74. Downward movement the cam member 138 (see FIG. 29) causes the fingertips 102 to move toward each other and sweep ply 82 onto the web sections 78 as the forming head 64 moves downwardly. While a cam mechanism has been disclosed, a variety of other known mechanism may be employed to control the position of the forming fingers 100 during the ply sweeping process.

Figure 30:
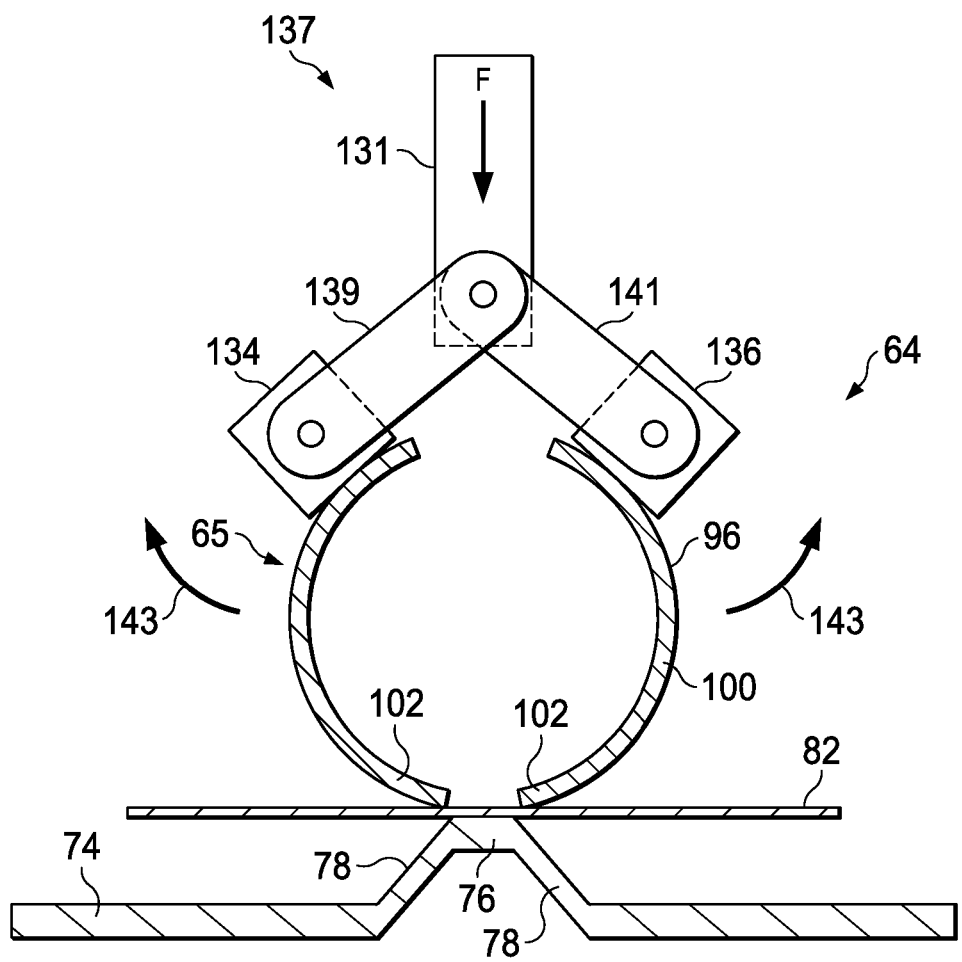
FIG. 30 is an illustration of a cross-sectional view showing a further feature of the split finger ply sweeper in which the finger halves rotate to sweep the cap and cap/web outside radius prior to full engagement of the web/flange inside radius.

Attention is now directed to FIG. 30 which illustrates another embodiment of the forming head 64 which employs a link mechanism 137 for controlling the movement of fingers 100 during a ply sweeping operation. A drive link 131 is pivotally connected to one end of each of two connecting links 139, 141. The other ends of the connecting links 139, 141 are respectively pivotally connected to a pair of spreader blocks 134, 136 that are fixed to two separate, opposed sets of the forming fingers 100. A downward force F applied to the drive link 131 is transmitted through the connecting links 139, 141 to the fingers 100. The fingers 100 rotate 143 in response to the force applied by the connecting links 139, 141, thereby controlling the movement of the fingertips 102 during sweeping of a ply 82 down over the web sections 78 of the mandrel 74. A pair of blocks 145 act as stops that engage the spreader blocks 134, 136 to limit the rotation of the fingers 100.

Figure 31:
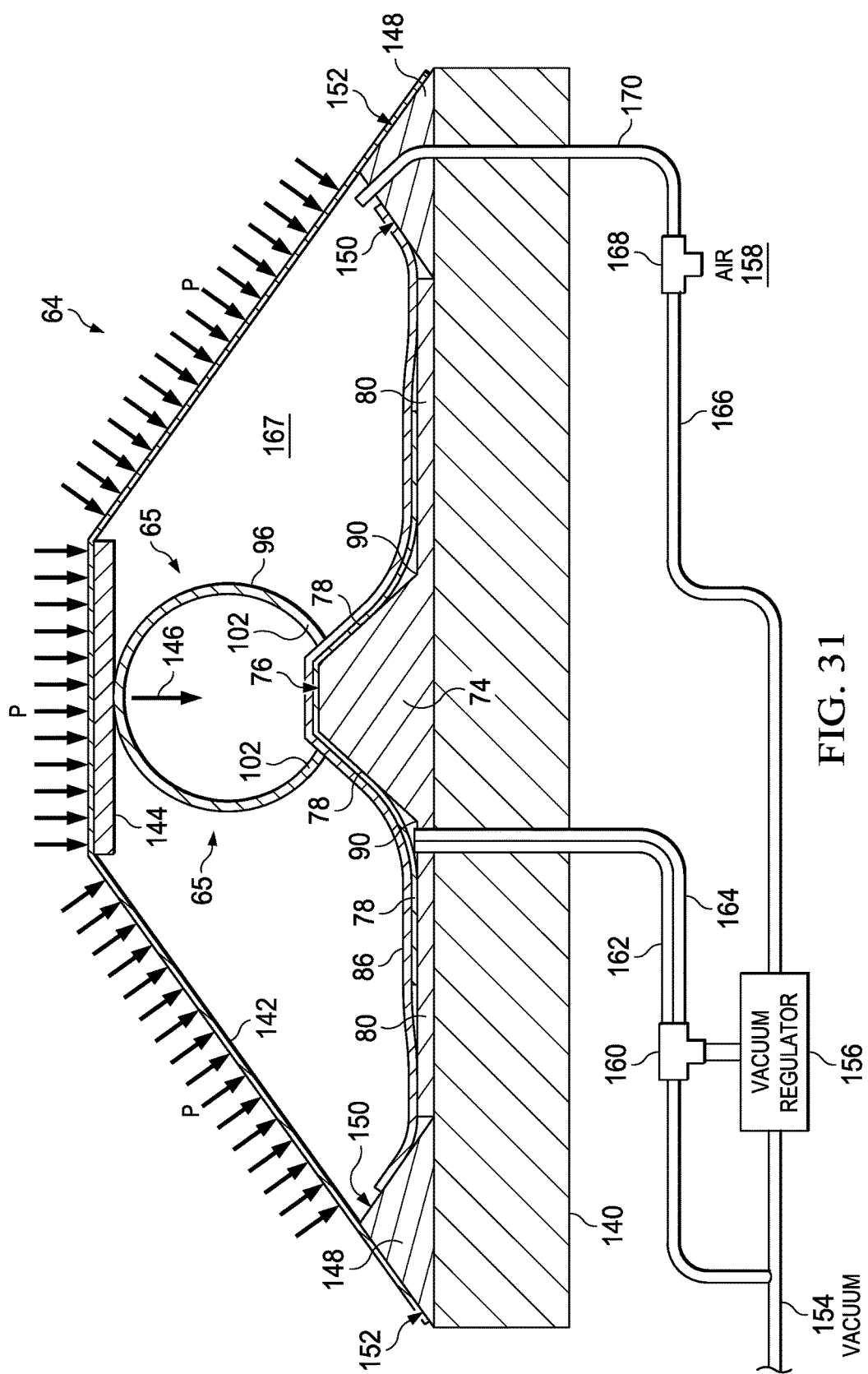
FIG. 31 is an illustration of a cross-sectional view showing an alternate embodiment of the apparatus for mechanically sweeping and vacuum forming plies on a contoured mandrel.

FIG. 31 illustrates an alternate embodiment of a forming apparatus, in which the force used to displace the sweeper 65 is supplied by an outer diaphragm or vacuum bag 142. In this embodiment, the mandrel 74 is mounted on a tool base 140, along with a pair of sealing blocks 48. Each of the sealing blocks 148 extends longitudinally along the outer edges of the flange sections 80 and includes inner and outer seal surfaces 150, 152. An inner diaphragm 86 (discussed previously) is placed over a ply 82 and is adapted to be sealed against the inner seal surface 150. The outer diaphragm 142 covers the forming head 64 and is sealed to the outer seal surface 152 of blocks 148, forming a vacuum tight outer chamber 167. A caul plate 144 may be placed between the ply sweeper 65 and the outer diaphragm 142 in order to concentrate and direct pressure P from the outer diaphragm 142 onto the ply sweeper 65. A pair of vacuum lines 162, 164 pass through the mandrel 74 and are adapted to evacuate the area beneath the inner diaphragm 86. A third vacuum line 170 is coupled through a valve 168 to both the ambient atmospheric air 166 and the vacuum regulator 156. The vacuum line 170 passes through one of the blocks 148 and communicates with outer chamber 167 beneath the outer diaphragm 142.

In operation, a ply 82 is placed over the mandrel 74, and the inner diaphragm 86 is placed over ply 82 and sealed to the inner seal surfaces 150. The outer diaphragm 142 along with the forming head 64 is then positioned over the mandrel 74, and the outer diaphragm 142 is sealed to the outer seal surfaces 152. A partial vacuum is then drawn on both the inner and outer diaphragms 86, 142 respectively, using vacuum lines 164, 170. The partial vacuum in the outer chamber 167 produces a pressure P that forces the forming head 64 downwardly, causing the fingertips 102 of the ply sweeper 65 to form the ply 82 down over the web sections 78 of the mandrel 74.

When the fingertips 102 bottom out at the inside radii 90, a hard vacuum is pulled on the inner diaphragm 86 while the partial vacuum on the outer diaphragm 142 is released through vacuum line 170 and valve 168. The hard vacuum pulled on the inner diaphragm 86 forms the ply 82 down onto the flange sections 80 of the mandrel 74. In order to assist in removing the sealed inner diaphragm 86, positive pressure may be applied to the inner diaphragm 86 using the line 162. The inner and outer diaphragms 86, 142, along with the forming head 64 are then removed to allow the fully formed ply 82 to be removed from the mandrel 74.

It should be noted here that, as previously mentioned, other techniques and mechanisms can be employed to actuate a stroke of the forming head 64 such as, without limitation, clamps, pneumatic cylinders, threaded screw drives, robots, hoses and outer diaphragms, to name only a few.

Figure 32:
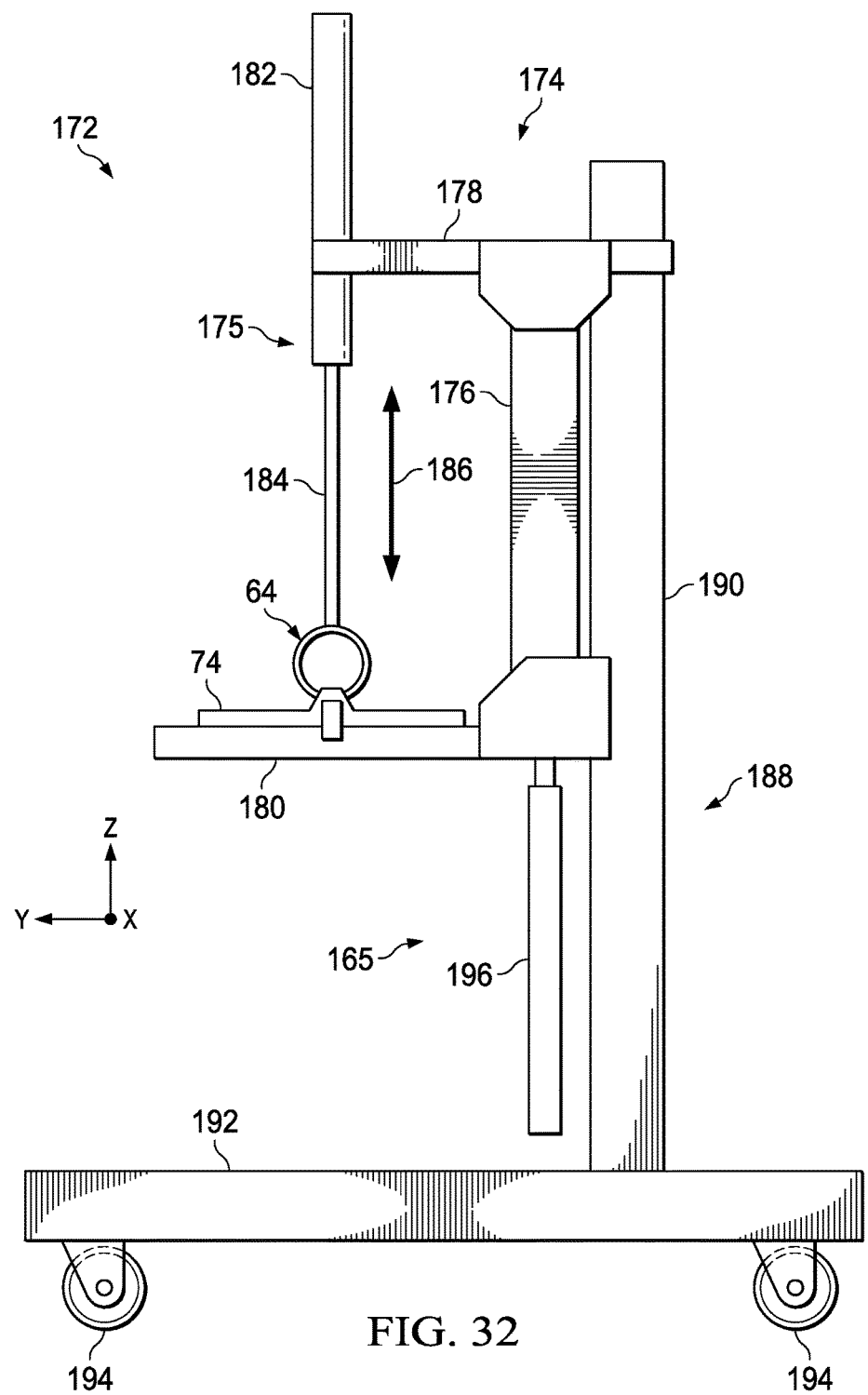
FIG. 32 is an illustration of an end elevational view of one embodiment of a forming unit for forming composite laminate prepreg plies on a mandrel contoured in one plane.

Attention is now directed to FIG. 32 which illustrates a portable forming unit 172 that may be used to form a portion of the length of a contoured composite laminate stringer 50. As will be discussed below in more detail, a plurality of the forming units 172 may be assembled side-by-side to form various portions of the stringer 50 which respectively may have differing contours. In the example illustrated in FIG. 32, one or more composite laminate plies (not shown in FIG. 32) are formed on a mandrel 74 having one or more contours in the X-Z plane in order to form a composite laminate stringer 50 having variations in pitch. In other embodiments, the mandrels 74 may have one or more contours in the X-Y plane (variations in yaw), and/or one or more contours in the Y-Z plane (variations in roll).

The portable forming unit 172 broadly comprises a former module 174 mounted on a movable platform, which in one embodiment, may comprise a mobile cart 188. Other forms of movable platforms are possible, depending on the application. The former module 174 includes a C-shaped frame 175 having a vertical support 176, an upper arm 178, and a lower arm 180. The former module 174 also includes a forming head 64 mounted on a piston rod 184 of a cylinder 182 for movement along the Z-axis. The cylinder 182 may be, for example and without limitation part of a hydraulic or pneumatic powered cylinder. The mandrel 74 is removably mounted on the lower arm 180 by any suitable means, such as a hand operated clamp (not shown).

The mobile cart 188 comprises an upright member 190 on which the vertical support 176 is mounted, as well as a cart base 192 having wheels 194 that allow the cart 188 to be moved over a supporting surface such as a factory floor (not shown). An adjustment mechanism 165 is provided for adjusting the position and orientation of the former module 174 on the upright 190 for movement along the Z axis. In one embodiment, the adjustment mechanism 165 may comprise a screw drive 196 that may be manually or power driven to adjust the orientation of the former module 174 to match the contour of local sections of the mandrel 74.

Figure 33:
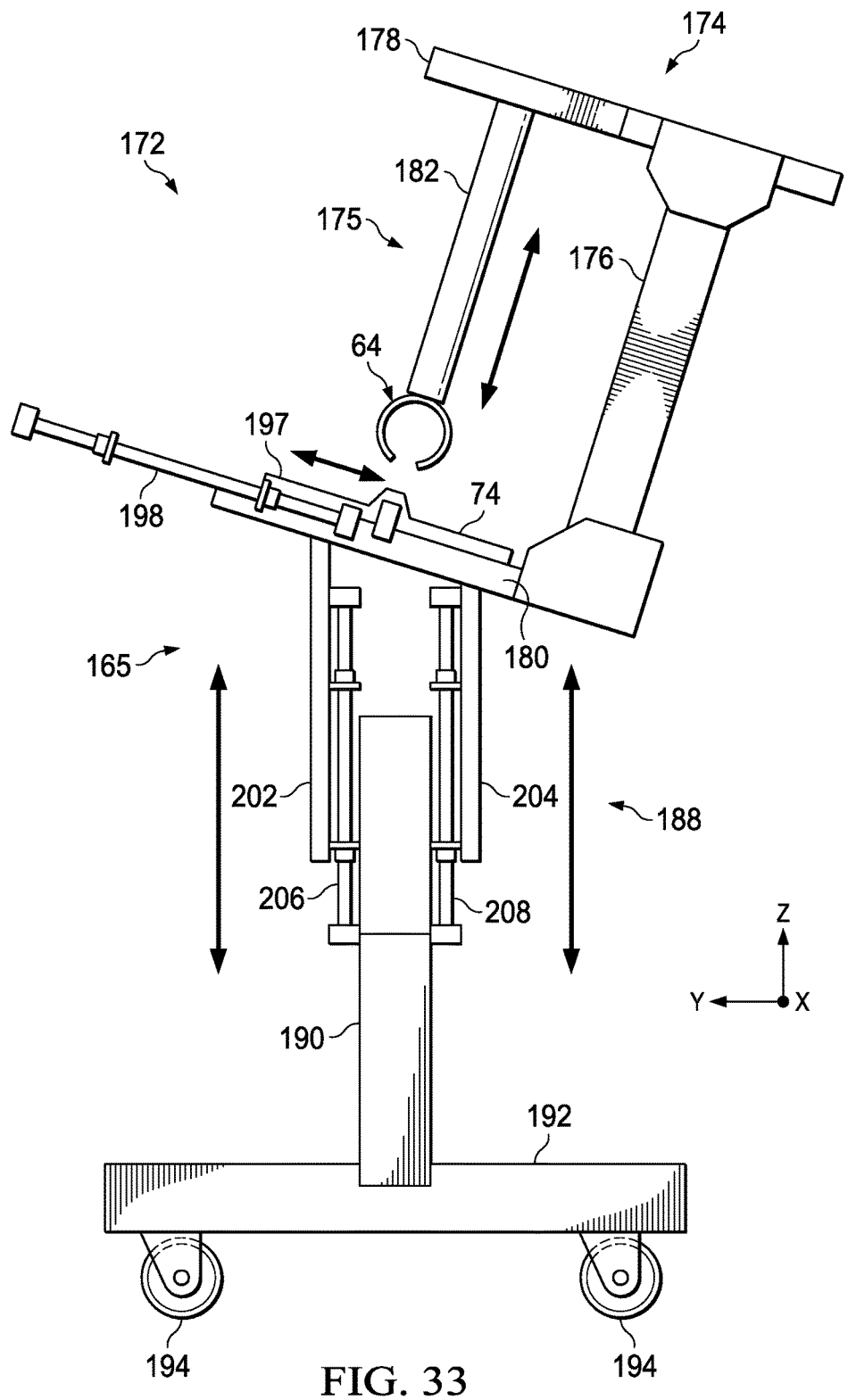
FIG. 33 is an illustration of an end elevational view of another embodiment of a forming unit for forming composite laminate prepreg plies on a mandrel contoured in multiple planes.

FIG. 33 illustrates an alternate embodiment of a forming unit 172 that includes independent adjustment of the roll, pitch and yaw of a forming head 64, thereby allowing a composite laminate stringer 50 to be formed that has complex contours, such as the stringer shown in FIGS. 1-5. The forming unit 172 shown in FIG. 33 is similar to that shown in FIG. 32, but additionally has adjustment mechanisms 165 for adjusting the pitch (X-Z plane), roll (Y-Z plane) and yaw (X-Y plane) of the forming head 64. The adjustment mechanism 165 includes screw drives 198, 206 and 208. Roll of the entire former module 174 may be adjusted using screw drive 206, 208 to adjust the position of slides 202, 204 that support the C-shaped frame 175 on a cart upright 190. The yaw of the former module 174 may be adjusted using screw drive 198 to rotate the C-shaped frame 175 on the cart upright 190. It should be noted here that various alternate mechanisms may be used to adjust the yaw, pitch and/or roll of the forming head 64 relative to the mandrel 74, and any or all of these mechanisms may be part of the forming head 64, or part of the former module 174 or part of the cart 188. The adjustment mechanisms described above provide a form of passive compliance that permits the sweeper 64 to be aligned with local contours of the mandrel 74.

Figure 34:
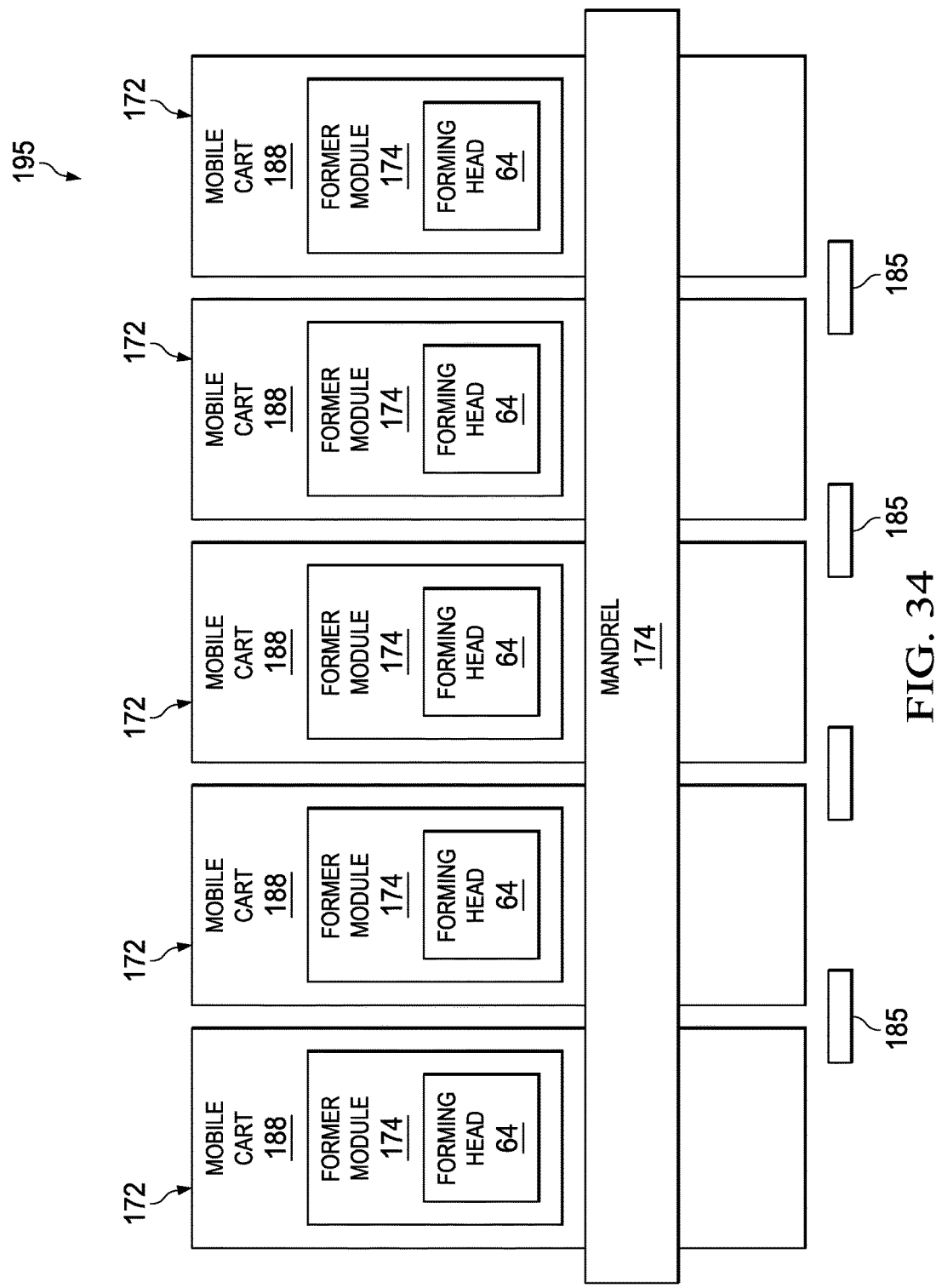
FIG. 34 is an illustration of a combined block and diagrammatic view of forming apparatus employing the forming units of the FIG. 33 arranged side-by-side.

A plurality of the forming units 172 of the type shown in FIGS. 32 and 33 may be assembled together to collectively form an apparatus for forming a composite prepreg laminate having complex contours. For example, referring to FIG. 34, a forming apparatus 195 comprises a plurality of the forming units 172 arranged side-by-side which may be mechanically connected together by suitable mechanical interlocks 185. Each of the forming units 172 is aligned with local contours of the forming mandrel 74 and is operative to form a section of the prepreg laminate. Each of the forming units 172 comprises a former module 174 that is associated with a section of the mandrel 74 and is mounted on a mobile cart 188, or similar mobile platform. Each of the former modules 174 includes the previously discussed features necessary to permit adjustment of yaw, pitch and roll of the forming head 64 to substantially match the local contouring of the mandrel 74. The number of the forming units 172 assembled together will depend upon the length of the particular layup mandrel 74 being employed. The use of the individual forming units 172 permits the forming units 172 to be readily interchanged, for repair or service, and provides the flexibility to add or remove forming units 172, as required to suit the particular application.

Figure 35:
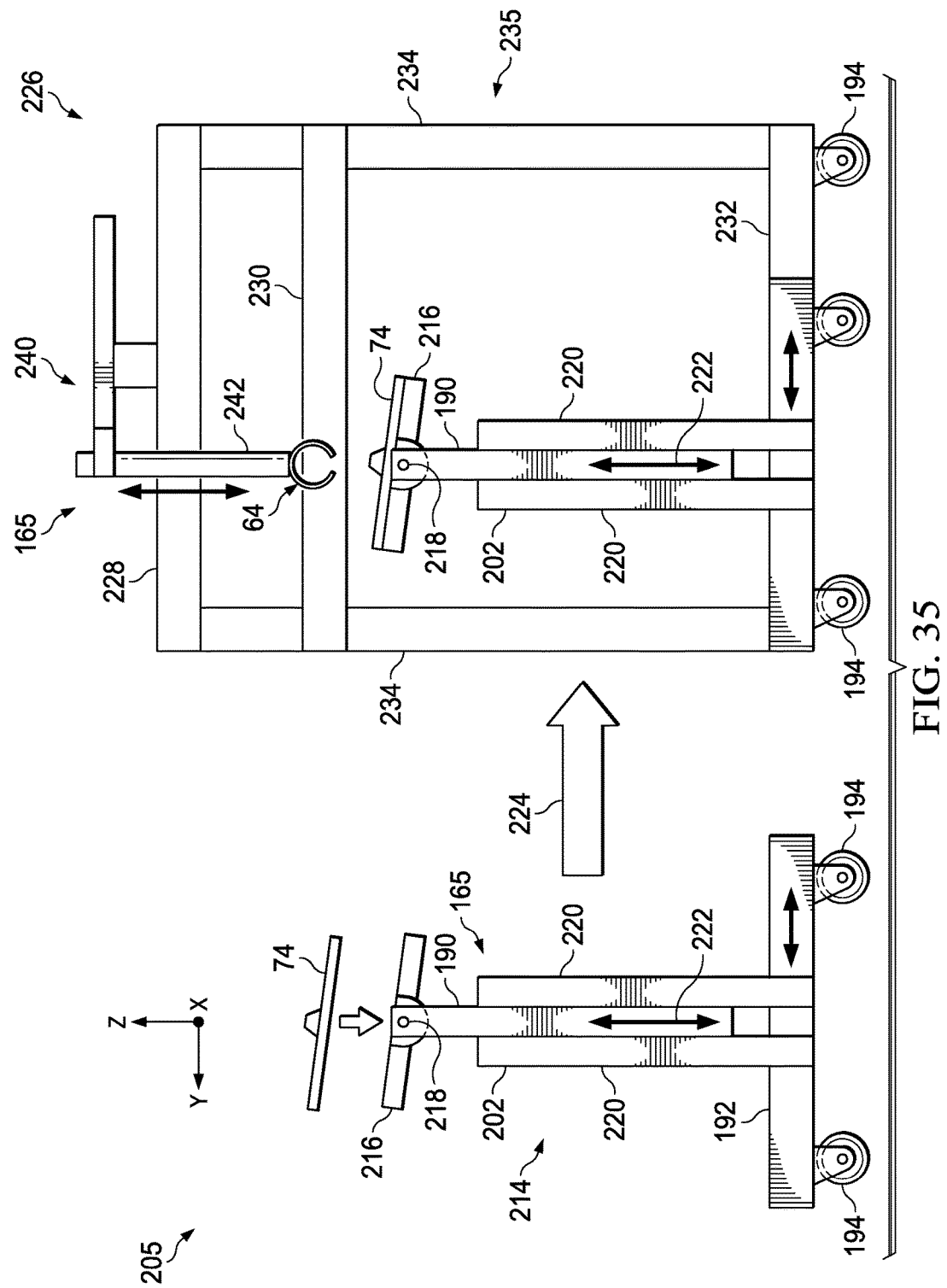
FIG. 35 is an illustration of an end elevational view of a mobile cart interfacing with a forming station.
Figure 36:
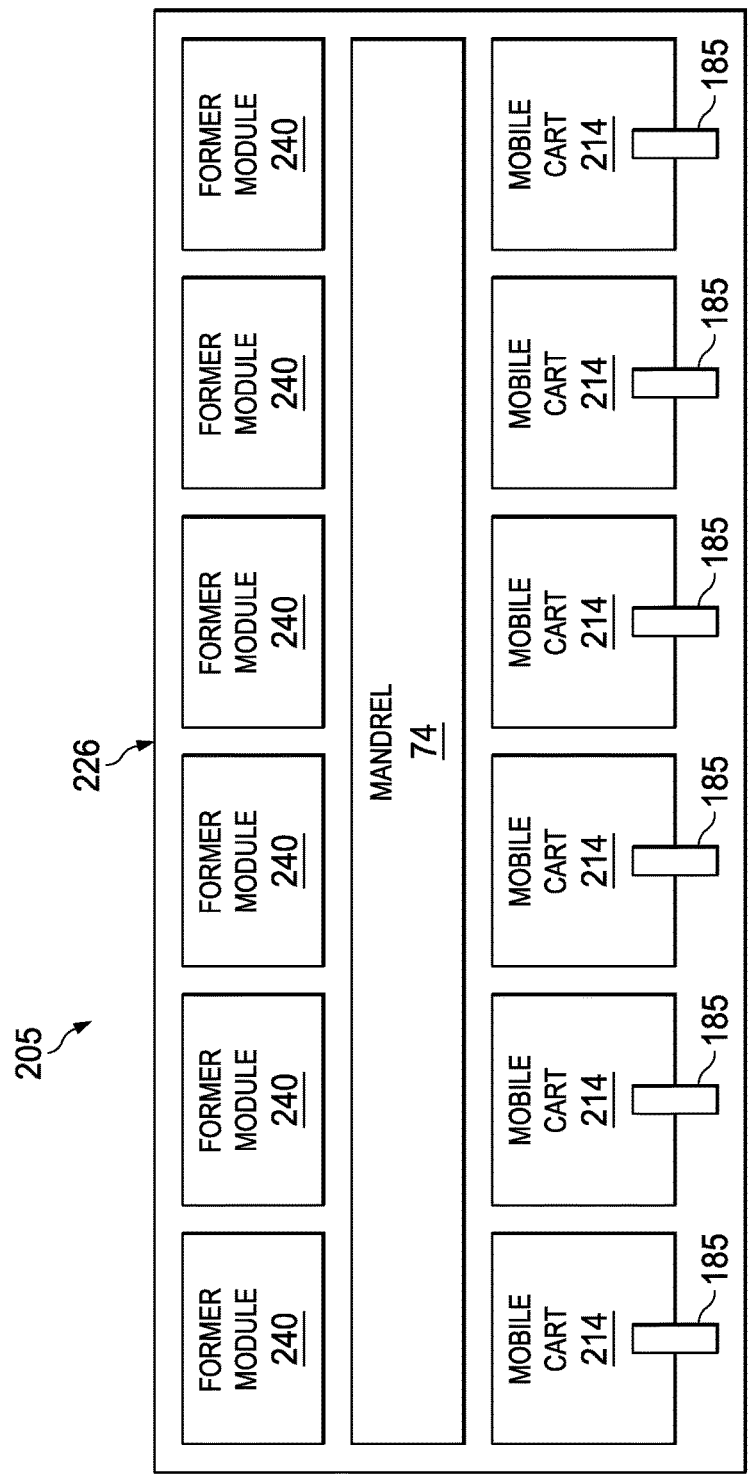
FIG. 36 is an illustration of a combined block and diagrammatic view of forming apparatus employing the mobile cart and forming station shown in FIG. 35.
Figure 37:
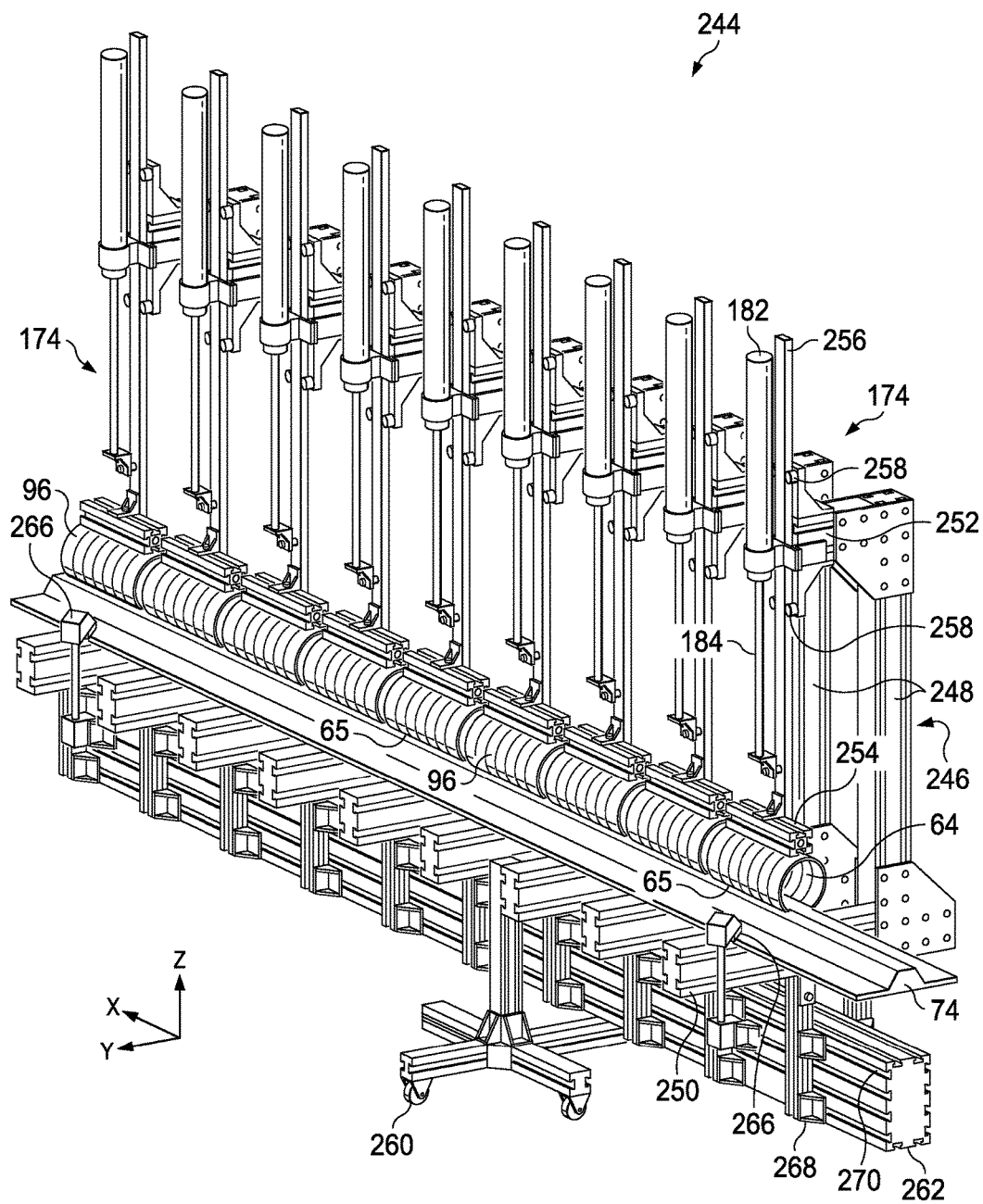
FIG. 37 is an illustration of a perspective view of an alternate form of a forming apparatus.
Figure 38:
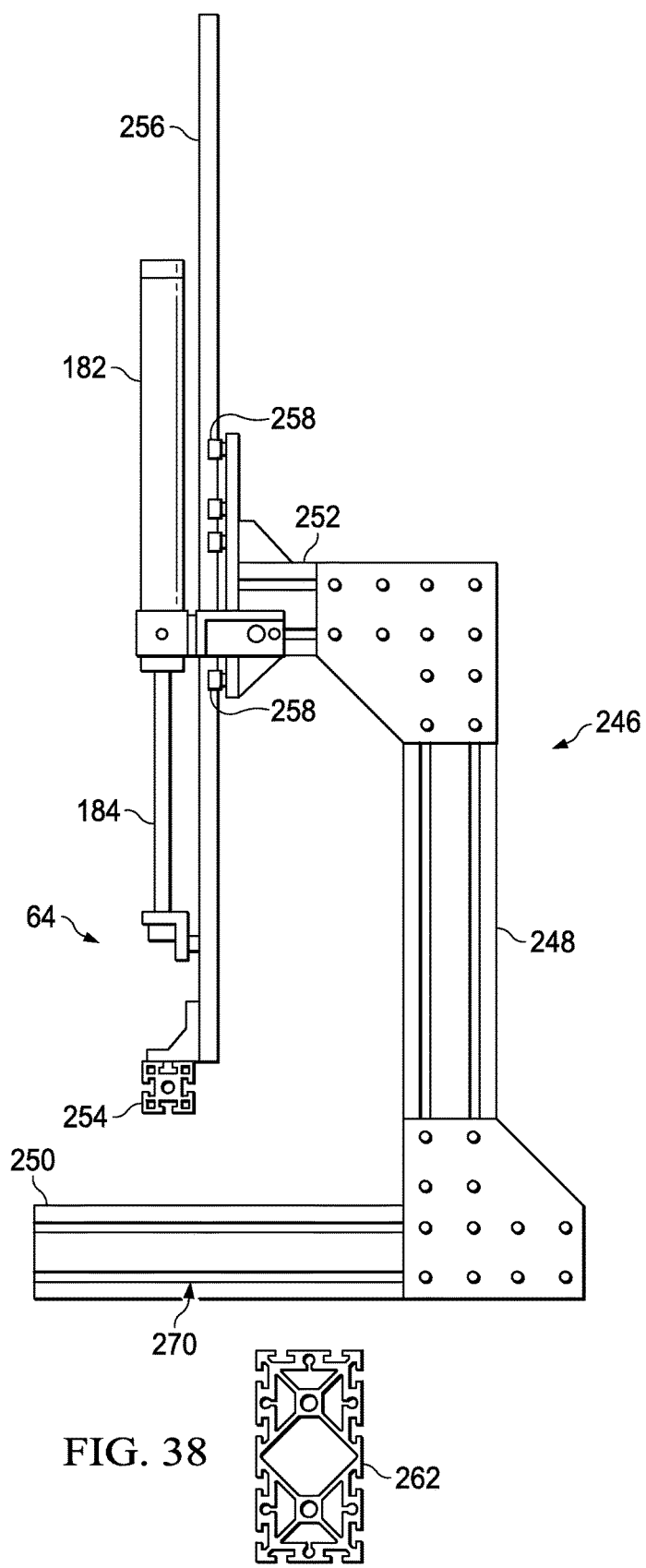
FIG. 38 is an illustration of a side elevational view of one of the former modules shown in FIG. 37.
Figure 39:
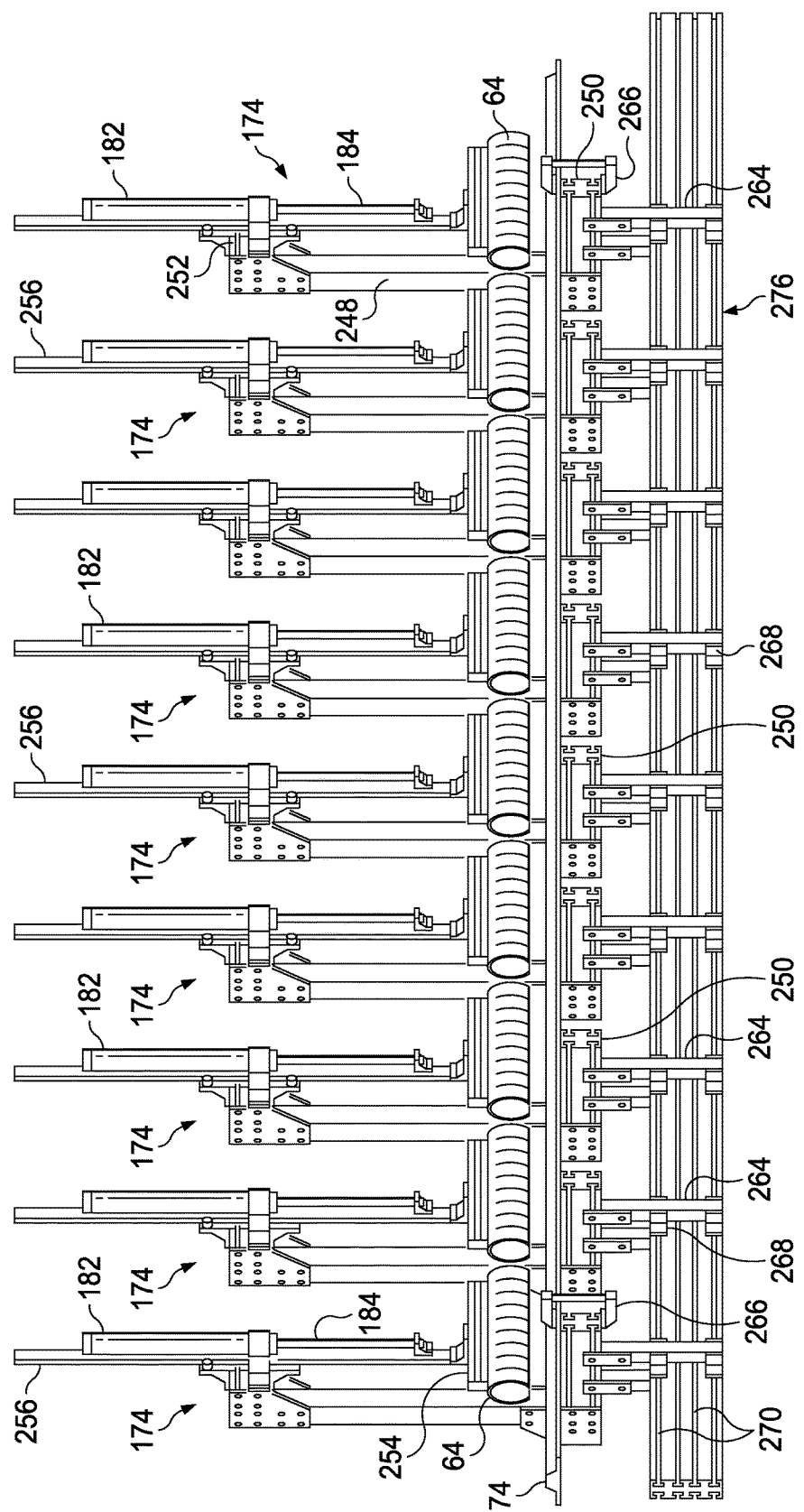
FIG. 39 is an illustration of a front perspective view of the forming apparatus shown in FIG. 37.
Figure 40:
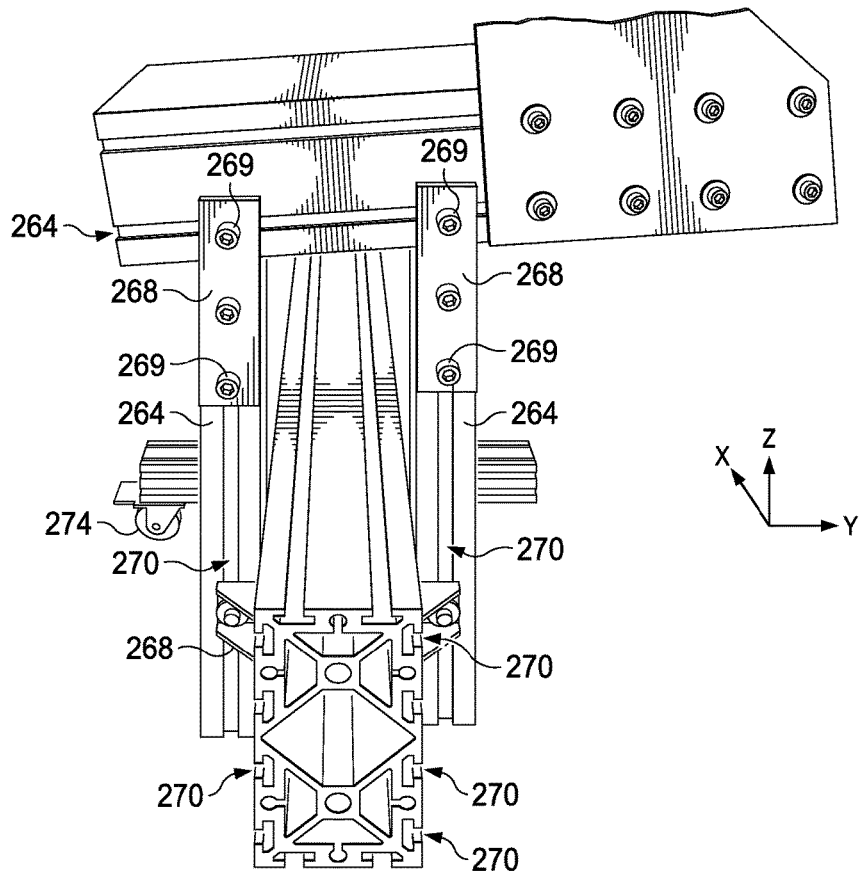
FIG. 40 is an illustration of an isometric view of a portion of the forming apparatus shown in FIGS. 37 and 39.

Attention is now directed to FIGS. 35 and 36 which illustrate apparatus 205 useful in layup, forming, handling and installation of composite prepreg laminates such as stringers. The apparatus 205 broadly comprises one or more forming stations 226, and one or more interfacing mobile carts 214. Each of the forming stations 226 includes a former module 240 provided with a forming head 64 and a mechanism 165 for adjusting the roll, pitch and/or yaw of the forming head 64 to match local contours of a mandrel 74, similar to the embodiments previously described. The former module 240 is mounted on a frame assembly 235 comprising uprights 234 and a series of cross members 228, 230, 232. The frame assembly 235 may be provided with wheels 194 to facilitate portability of the forming station 226.

Each of the mobile carts 214 comprises a mandrel support table 216 on which at least a portion of a mandrel 74 may be supported. The spacing between adjacent ones of the support tables 216 substantially matches the spacing between adjacent ones of the former modules 240, such that each of the support tables 216 is aligned with one of the former modules 240. The support table 216 is mounted on one or more uprights 190. The uprights 190 are attached to vertical frame members 220 that are supported on a base 192 having wheels 194. The uprights 190 are vertically slidable on the frame members 222 allow the vertical height of the support table 216, and thus of the mandrel 74 to be adjusted.

In use, the mandrel 74 may be placed on the support table 216 of one or more of the mobile carts 214, and the carts 214 may be rolled 224 into the forming station 226, such that the mandrel 74 is aligned beneath the forming head 64. Alternatively, the mandrel 74 may be placed on the carts 214 after the latter have been rolled 224 into the forming station 226. In order to maintain alignment of forming head with the mandrel 74, a mechanical interlock 185 may be provided between the forming station 226 and the mobile cart 214. After one or more prepreg plies have been laid up and formed in the forming station 226, the cart 214 may be used to transport the fully formed stringer to another processing station where the carts 214 may be used to handle or manipulate the stringer. For example, the carts 214 may be used to install the formed stringer in a cure tool (not shown).

Attention is now directed to FIGS. 37-40 which illustrate another embodiment of the former apparatus 244 which employs features of the embodiments previously discussed. The apparatus 244 comprises a plurality of individual former modules 174 mounted on a common base, which in illustrated embodiment, comprises a center support beam 262. The center beam 262 may be supported on one or more sets of wheels 260 which provide the former apparatus 244 with mobility.

Each of the former modules 174 comprises a forming head 64 supported on a C-shaped frame 246. The C-shaped frame 246 includes an upright 248, a lower arm 250 and an upper arm 252. A contoured mandrel 74 is removably mounted on the lower arms 250 (FIG. 37) by any suitable mechanism, such as hand clamps 266. Each of the C-shaped frames 246 is mounted on the center beam 262 by a pair of vertical supports 264. The vertical supports 264 are adjustably connected between the lower arm 250 and the center beam 262 by a series of brackets 268 and fasteners 269 received within ways 270 forming slides. The fasteners 269 (see FIG. 40) selectively fix the brackets 268 in any desired adjustment position. Adjustment of the position of brackets 268 in turn allows adjustment of the position of the C-shaped frame 246, and thus of the forming head 64, in both the Y-Z (roll) and X-Z (pitch) planes. Guide rails and linear actuators (not shown) may be employed for moving and adjusting the vertical supports 264 and the lower arm 250.

Each of the forming heads 64 may comprise a ply sweeper 65 attached by suitable hardware 254 a guide rail 256. The individual ply sweepers 65 (tubes 96) are linked together by the C-shaped frames 246 and the center support beam 262. The adjustability of the C-shaped frames 246 provides the apparatus 244 with passive compliance which allows adjustment of the sweepers 64 to match local contouring of the mandrel 74. The guide rail 256 is mounted for linear movement along the Z-axis on the outer end of the upper arm 252 by two sets of guide rollers 258, A pneumatic drive cylinder 182 mounted on the upper arm 252 has a piston rod 184 attached to the forming head 64. The cylinder 182 displaces the forming head 64 during the forming process, guided by the rail 256. In the illustrated embodiment, the ply sweeper 65 comprises a plurality of forming fingers on a tube 96, however, other embodiments of the ply sweeper 65 previously discussed may be used.

Figure 41:
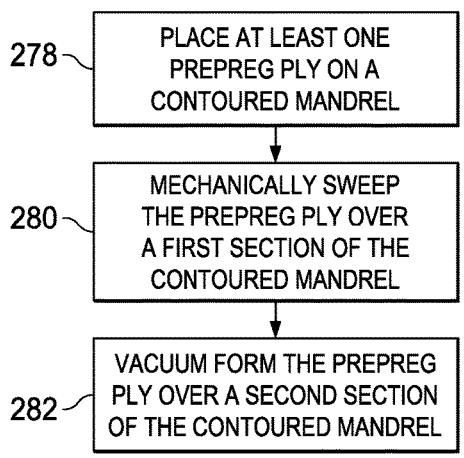
FIG. 41 is an illustration of a flow diagram of a method of forming contoured composite prepreg plies.

Reference is now made to FIG. 41 which broadly illustrates the overall steps of a method of forming a contoured composite prepreg laminate, such as the stringer 50 shown in FIGS. 1-5. Beginning at step 278, at least one prepreg ply 82 is placed on a contoured mandrel 74. Then, at step 280, the prepreg ply 82 is mechanically swept over a first section 78 of the contoured mandrel 74. Finally, at 282, the prepreg ply is then vacuum formed over a second section 80 of the contoured mandrel.

Figure 42:
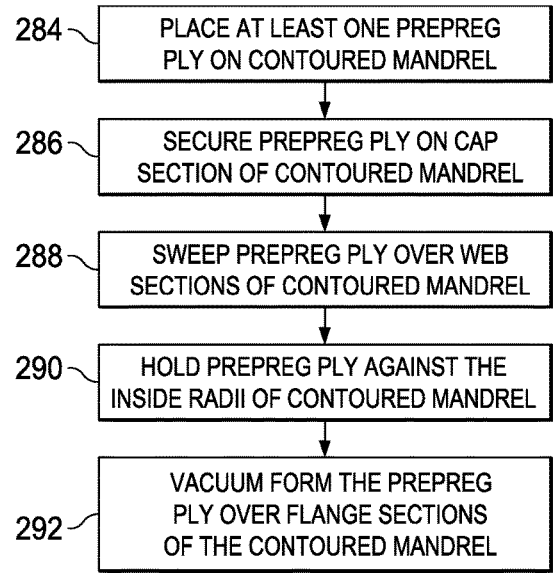
FIG. 42 is an illustration of a flow diagram of a method of forming contoured composite prepreg stringers.

FIG. 42 broadly illustrates the overall steps of a method of forming a composite prepreg, hat-type stringer 50. Beginning at 284, at least one prepreg ply is placed on a contoured mandrel 74. At 286, the prepreg ply 82 is secured on a cap section 76 of the contoured mandrel 74. At step 288, the prepreg ply 82 is swept over web sections 78 of the contoured mandrel 74. At 290, the prepreg ply 82 is held against the inside radii 90 of the contoured mandrel 74. With the prepreg ply 82 held against the inside radii 90, then, at step 292, the prepreg ply 82 is then vacuum formed over flange sections 80 of the contoured mandrel 74.

Figure 43:
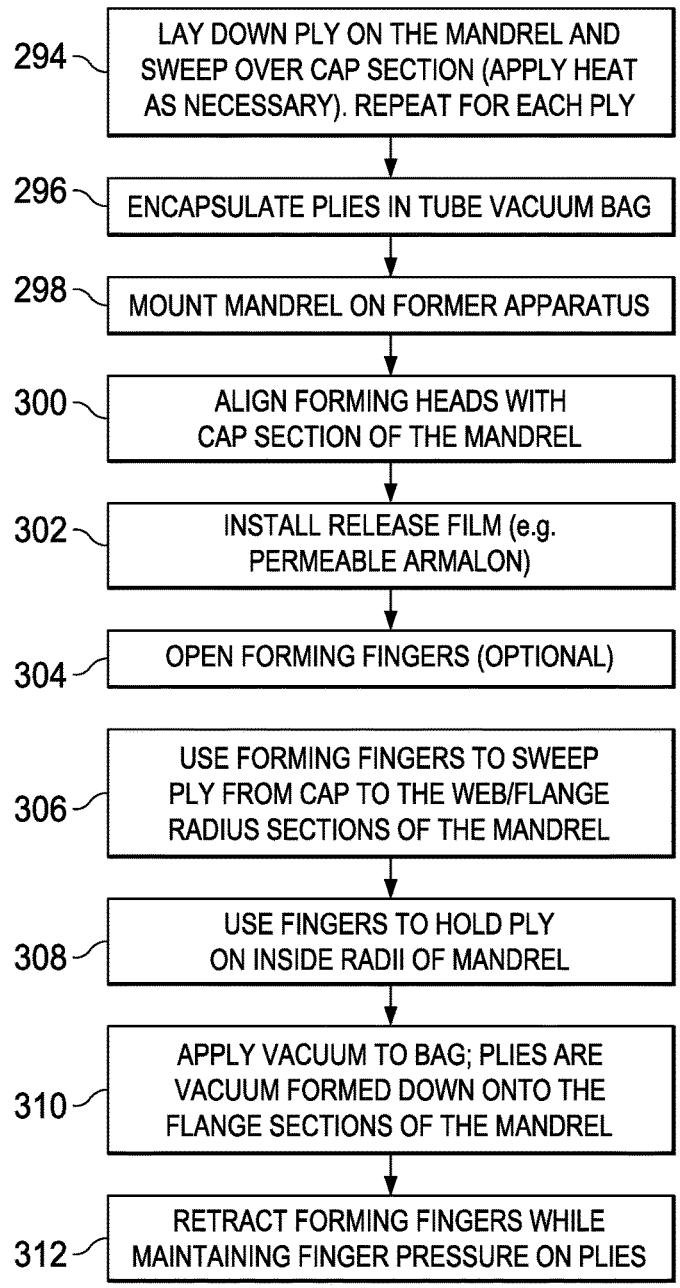
FIG. 43 is an illustration of a flow diagram of a method of laying up and forming composite prepreg laminate stiffeners.

Attention is now directed to FIG. 43 which illustrates a further embodiment of a method of laying up and forming composite prepreg laminate stiffeners, such as a stringer 50. At 294, one or more plies 82 are laid down on the mandrel 74 and swept over the cap section 76. Heat may be applied to the plies 82, as required, to soften the plies 82 in preparation for forming, and/or to assist in tacking them to the cap section 76. Next, at 296, the plies 82 are encapsulated in a vacuum membrane, such as a flexible tube bag 105.

At 298, the mandrel 74 having the plies laid up thereon is transferred to and mounted in a former apparatus 244. At 300, each of the forming heads 64 of the apparatus 244 is aligned with the cap section 76 of the mandrel 74. At step 302, a release film such as permeable Armalon® is installed over the encapsulated plies 82. In some embodiments, the Armalon® may be integrated into or removably attached to the former module 174, thus eliminating the need to perform step 302.

At 304, optionally, the forming fingers 102 are opened a distance that is sufficient to clear the cap section 76. At 306 forming fingers 102 are used to sweep the ply 82 over the web/flange radius of the mandrel 74. At 308, the forming fingers 102 are used to hold the plies 82 at the inside radii 90 of the mandrel 74. At 310, vacuum is applied to the bag, resulting in the plies being vacuum formed down onto the flange sections 80 of the mandrel 74. At step 312, the forming fingers 102 are retracted while vacuum is maintained against the plies 82.

The method described above in connection with FIG. 43 involves sweeping and then vacuum forming each ply 82. Other words, the plies 82 are fully formed one-by-one onto all sections of the mandrel 74. Alternatively, in another embodiment, multiple plies, or all of the plies may be swept over the web/flange radius before the flange sections 80 are vacuum formed. Once the multiple plies have been formed over the web/flange radius, then the entire group of plies is vacuum formed in order to form the flange sections 80. In other words, the vacuum forming of the plies 82 down onto the flange sections 80 is performed only after all of the plies 82 have been swept over the web/flange radius.

Figure 44:
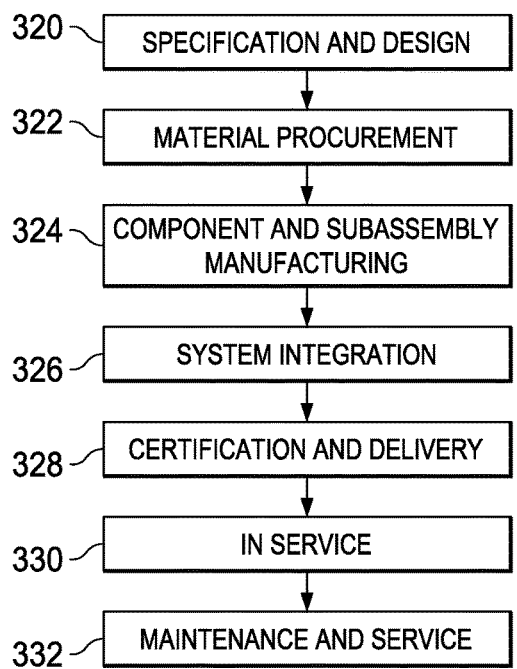
FIG. 44 is an illustration of a flow diagram of aircraft production and service methodology.
Figure 45:
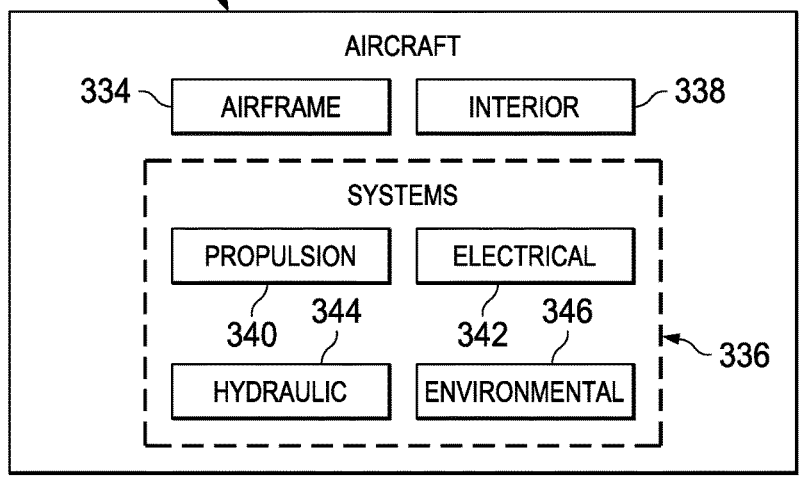
FIG. 45 is an illustration of a block diagram of an aircraft.

Embodiments of the disclosure may find use in a variety of potential applications, particularly in the transportation industry, including for example, aerospace, marine, automotive applications and other application where contoured elongate composite laminate stiffeners, such as stringers, may be used. Thus, referring now to FIGS. 44 and 45, embodiments of the disclosure may be used in the context of an aircraft manufacturing and service method 316 as shown in FIG. 44 and an aircraft 318 as shown in FIG. 45. Aircraft applications of the disclosed embodiments may include, for example, without limitation, a variety of composite structural members, including but not limited to stringers. During pre-production, exemplary method 316 may include specification and design 320 of the aircraft 318 and material procurement 322. During production, component and subassembly manufacturing 324 and system integration 326 of the aircraft to 318 takes place. Thereafter, the aircraft 318 may go through certification and delivery 328 in order to be placed in service 330. While in service by a customer, the aircraft 318 is scheduled for routine maintenance and service 332, which may also include modification, reconfiguration, refurbishment, and so on.

Each of the processes of method 316 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 45, the aircraft 318 produced by exemplary method 294 may include an airframe 334 with a plurality of systems 336 and an interior 338. Examples of high-level systems 336 include one or more of a propulsion system 340, an electrical system 342, a hydraulic system 344 and an environmental system 346. Any number of other systems may be included. Although an aerospace example is shown, the principles of the disclosure may be applied to other industries, such as the marine and automotive industries.

Systems and methods embodied herein may be employed during any one or more of the stages of the production and service method 316. For example, components or subassemblies corresponding to production process for 324 may be fabricated or manufactured in a manner similar to components or subassemblies produced while the aircraft 318 is in service. Also, one or more apparatus embodiments, method embodiments, or a combination thereof may be utilized during the production stages 324 and 326, for example, by substantially expediting assembly of or reducing the cost of an aircraft 318. Similarly, one or more of apparatus embodiments, method embodiments, or a combination thereof may be utilized while the aircraft 318 is in service, for example and without limitation, to maintenance and service 332.

As used herein, the phrase "at least one of", when used with a list of items, means different combinations of one or more of the listed items may be used and only one of each item in the list may be needed. For example, "at least one of item A, item B, and item C" may include, without limitation, item A, item A and item B, or item B. This example also may include item A, item B, and item C or item B and item C. The item may be a particular object, thing, or a category. In other words, "at least one of" means any combination items and number of items may be used from the list but not all of the items in the list are required.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus for forming a composite prepreg structure, comprising:
   a mandrel having a contoured surface on which a prepreg ply may be placed;
   a forming head configured to sweep the prepreg ply onto a first portion of the contoured surface of the mandrel, wherein the forming head includes a tube having a plurality of slots therein, and a plurality of fingers defined between the slots, wherein the fingers are configured to slidably engage and press the prepreg ply against the first portion of the contoured surface of the mandrel; and
   a flexible diaphragm covering the prepreg ply and configured to vacuum form the prepreg ply onto a second portion of contoured surface of the mandrel.

2. The apparatus of claim 1, wherein the fingers are flexible and include fingertips for individually engaging the prepreg ply.

3. The apparatus of claim 1, wherein:
   the forming head further includes a ram for displacing the forming head.

4. The apparatus of claim 3, wherein the mandrel is elongate and the tube extends along substantially the entire length of the mandrel and includes compliance for conforming the tube to the contoured surface of the mandrel.

5. The apparatus of claim 3, further comprising:
a plurality of the forming heads, each of the heads being configured to sweep the prepreg ply, and
wherein the tube is held on the forming heads.

6. The apparatus of claim 1, wherein the forming head further includes a device for spreading the fingers.

7. The apparatus of claim 6, wherein the device for spreading the fingers is a plate adjustably mounted on the forming head and contacting the fingers.

8. The apparatus of claim 6, wherein the device for spreading the fingers is an inflatable bladder.

9. The apparatus of claim 1, wherein the head includes a cam mechanism coupled with the fingers for controlling operation of the fingers.

10. The apparatus of claim 1, wherein the plurality of fingers includes:
opposed flexible fingers each having a fingertip, and
a forming element on each of the fingertips for engaging the flexible diaphragm covering the prepreg ply and forcing the prepreg ply to conform to the mandrel.

11. The apparatus of claim 1, wherein the diaphragm is sealed around its periphery and forms a chamber capable of being evacuated.

12. The apparatus of claim 1, wherein the diaphragm is a flexible vacuum bag surrounding the prepreg ply and is capable of being evacuated.

13. The apparatus of claim 1, wherein the forming head includes a device for securing a portion of the prepreg ply against a section of the mandrel.

14. An apparatus for forming a contoured composite laminate stringer having a hat cross-section and a pair of flanges, comprising:
a contoured elongate mandrel on which at least one composite prepreg ply may be placed, the mandrel having a cap section, a pair of web sections and a pair of flange sections; and
a plurality of former modules, each of the former modules including a forming head, wherein each of the forming heads includes a tube having a plurality of slots therein and forming fingers located between the slots configured to secure and sweep the prepreg ply onto the cap and web sections of the mandrel.

15. The apparatus of claim 14, further comprising:
a flexible diaphragm configured to be sealed around its periphery for vacuum forming the prepreg ply against the flange sections of the mandrel.

16. The apparatus of claim 15, wherein the flexible diaphragm comprises latex stretchable substantially only in one direction.

17. The apparatus of claim 15, wherein the tubes are linked together.

18. The apparatus of claim 15, wherein the tube extends along substantially the entire length of the contoured elongate mandrel and is held by the forming heads.

19. The apparatus of claim 14, wherein the fingers are flexible and are arranged in opposing sets of fingers.

20. The apparatus of claim 19, wherein each of the forming heads includes a mechanism for adjusting a distance between the opposing sets of fingers.

21. The apparatus of claim 14, wherein each of the former modules has an orientation that is adjustable.

22. The apparatus of claim 14, further comprising:
at least one mechanism for aligning the forming head with local sections of the mandrel.

23. The apparatus of claim 14, further comprising:
mechanisms for adjusting roll, pitch and yaw of the forming head.

24. The apparatus of claim 14, further comprising:
at least one support beam, and
wherein each of the former modules is mounted on the support beam.

25. The apparatus of claim 24, including a mechanism for adjusting a position of each of the former modules on the support beam.

26. The apparatus of claim 14, further comprising a drive for driving the forming fingers to sweep the prepreg ply onto the flange sections of the mandrel.

27. The apparatus of claim 26, wherein the drive includes a pneumatic cylinder for displacing the forming fingers.

28. The apparatus of claim 26, wherein the drive includes a flexible diaphragm configured to be sealed around its periphery for displacing the forming fingers.

29. The apparatus of claim 14, wherein:
each of the former modules includes a frame, and
the mandrel is mounted on the frame of each of the former modules.

30. The apparatus of claim 14, further comprising:
a plurality of mobile carts, and
each of the former modules is mounted on one of the mobile carts.

31. The apparatus of claim 14, further comprising:
a plurality of mobile carts on which the mandrel may be removably mounted; and
a forming station having each of the former modules mounted thereon and adapted to receive mobile carts.

32. An apparatus for forming a contoured composite prepreg laminate, comprising:
a contoured mandrel on which at least one composite prepreg ply may be formed;
a plurality of former modules arranged side-by-side for respectively forming the prepreg ply on the mandrel, each of the former modules including a forming head associated with a section of the mandrel for forming the prepreg ply on the associated section of the mandrel, wherein each forming head includes a tube having a plurality of slots therein, and a plurality of fingers defined between the slots, wherein the fingers are configured to slidably engage and press the prepreg ply against the first portion of the contoured surface of the mandrel; and
a mechanism for aligning each of the forming heads with the contour of the associated section of the mandrel.

33. The apparatus of claim 32, wherein the mechanism is capable of adjusting roll, pitch and yaw of the forming head.

34. The apparatus of claim 32, wherein:
each of the former modules includes a frame having a forming head mounted thereon, and
the mechanism includes slides for adjusting alignment of the frame.

* * * * *